(12) United States Patent
Tanaka et al.

(10) Patent No.: US 8,400,702 B2
(45) Date of Patent: *Mar. 19, 2013

(54) OPTICAL MODULATION DEVICE AND OPTICAL MODULATION METHOD

(75) Inventors: Toshiki Tanaka, Kawasaki (JP);
Hideyuki Miyata, Kawasaki (JP);
Yuichi Akiyama, Kawasaki (JP);
Takeshi Hoshida, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/805,065

(22) Filed: Jul. 9, 2010

(65) Prior Publication Data

US 2011/0032594 A1 Feb. 10, 2011

Related U.S. Application Data

(63) Continuation of application No. 12/058,406, filed on Mar. 28, 2008, now Pat. No. 7,773,283.

(30) Foreign Application Priority Data

Mar. 29, 2007 (JP) ................................ 2007-088622

(51) Int. Cl.
*G02B 26/00* (2006.01)

(52) U.S. Cl. ........ 359/239; 359/279; 398/182; 398/195; 398/147; 398/204

(58) Field of Classification Search .......... 359/237–238, 359/278–279, 315, 245, 247, 299, 310, 321, 359/248, 342, 344–345; 398/15, 33, 51, 398/94–95, 147, 182–183, 195–198, 204

See application file for complete search history.

(56) References Cited

U.S. PATENT DOCUMENTS

| 5,170,274 | A | 12/1992 | Kuwata et al. |
| 5,526,158 | A | 6/1996 | Lembo ........................ 398/204 |
| 6,278,539 | B1 | 8/2001 | Ooi et al. |
| 6,836,622 | B2 | 12/2004 | Kobayashi et al. ........... 398/198 |
| 7,006,769 | B1 | 2/2006 | Kawasaki et al. ............. 398/158 |
| 7,046,414 | B2 | 5/2006 | Ohhira ......................... 359/238 |
| 7,092,643 | B2 | 8/2006 | Kajiya et al. .................. 398/198 |
| 7,133,610 | B1 | 11/2006 | Shimura et al. ................. 398/15 |

(Continued)

FOREIGN PATENT DOCUMENTS

| DE | 20 2006 007 996 | 7/2006 |
| EP | 1 004 920 | 5/2000 |

(Continued)

OTHER PUBLICATIONS

A.H. Gnauck et al., "Optical Duobinary Format From Demodulation of DPSK Using Athermal Delay Interferometer", IEEE Photonics Technology Letters, vol. 18, No. 4, Feb. 15, 2006, pp. 637-639.

(Continued)

*Primary Examiner* — Dawayne A Pinkney
(74) *Attorney, Agent, or Firm* — Staas & Halsey LLP

(57) ABSTRACT

According to an aspect of an embodiment, an optical modulation device includes a Mach-Zehnder modulator and a controller. The Mach-Zehnder modulator is supplied a drive signal and a bias voltage. The Mach-Zehnder modulator modulates inputted light on the bases of the drive signal and the bias voltage. The drive signal selectively is superimposes a predetermined frequency signal. The bias voltage selectively is superimposes the predetermined frequency signal. The controller selects a superimposing target which is the drive signal or the bias voltage so as to change modulation formats.

8 Claims, 20 Drawing Sheets

U.S. PATENT DOCUMENTS

| | | | | |
|---|---|---|---|---|
| 7,200,343 | B2 | 4/2007 | Ikeuchi | 398/198 |
| 7,308,210 | B2 | 12/2007 | Khayim et al. | 398/198 |
| 7,379,637 | B2 | 5/2008 | Watanabe | 385/27 |
| 7,986,885 | B2 * | 7/2011 | Mamyshev | 398/188 |
| 2001/0007508 | A1 * | 7/2001 | Ooi et al. | 359/245 |
| 2005/0147346 | A1 * | 7/2005 | Vaa et al. | 385/27 |
| 2006/0127102 | A1 * | 6/2006 | Roberts et al. | 398/182 |
| 2006/0193228 | A1 * | 8/2006 | Bai | 369/59.23 |
| 2006/0263098 | A1 * | 11/2006 | Akiyama et al. | 398/188 |
| 2007/0183791 | A1 | 8/2007 | Rossetti et al. | |
| 2008/0080872 | A1 | 4/2008 | Tanaka et al. | 398/186 |

FOREIGN PATENT DOCUMENTS

| | | |
|---|---|---|
| JP | 3-251815 | 11/1991 |
| JP | 2000-162563 | 6/2000 |

OTHER PUBLICATIONS

P. Brindel et al., "Optical Generation of 43 Gbit/s Phase-shaped Binary Transmission Format from DPSK Signal using 50 GHz Periodic Optical Filter" ECOC 2005, Proceedings, vol. 4, pp. 847-848.

U.S. Appl. No. 12/058,406, filed Mar. 28, 2008, Toshiki Tanaka et al., Fujitsu Limited.

Extended European Search Report issued Aug. 18, 2008 in corresponding European Patent Application No. 08005510.6.

Office Action mailed from the Unites States Patent and Trademark Office on Aug. 5, 2009 in the related U.S. Appl. No. 12/058,406.

Notice of Allowance mailed from the Unites States Patent and Trademark Office on Mar. 9, 2010 in the related U.S. Appl. No. 12/058,406.

* cited by examiner

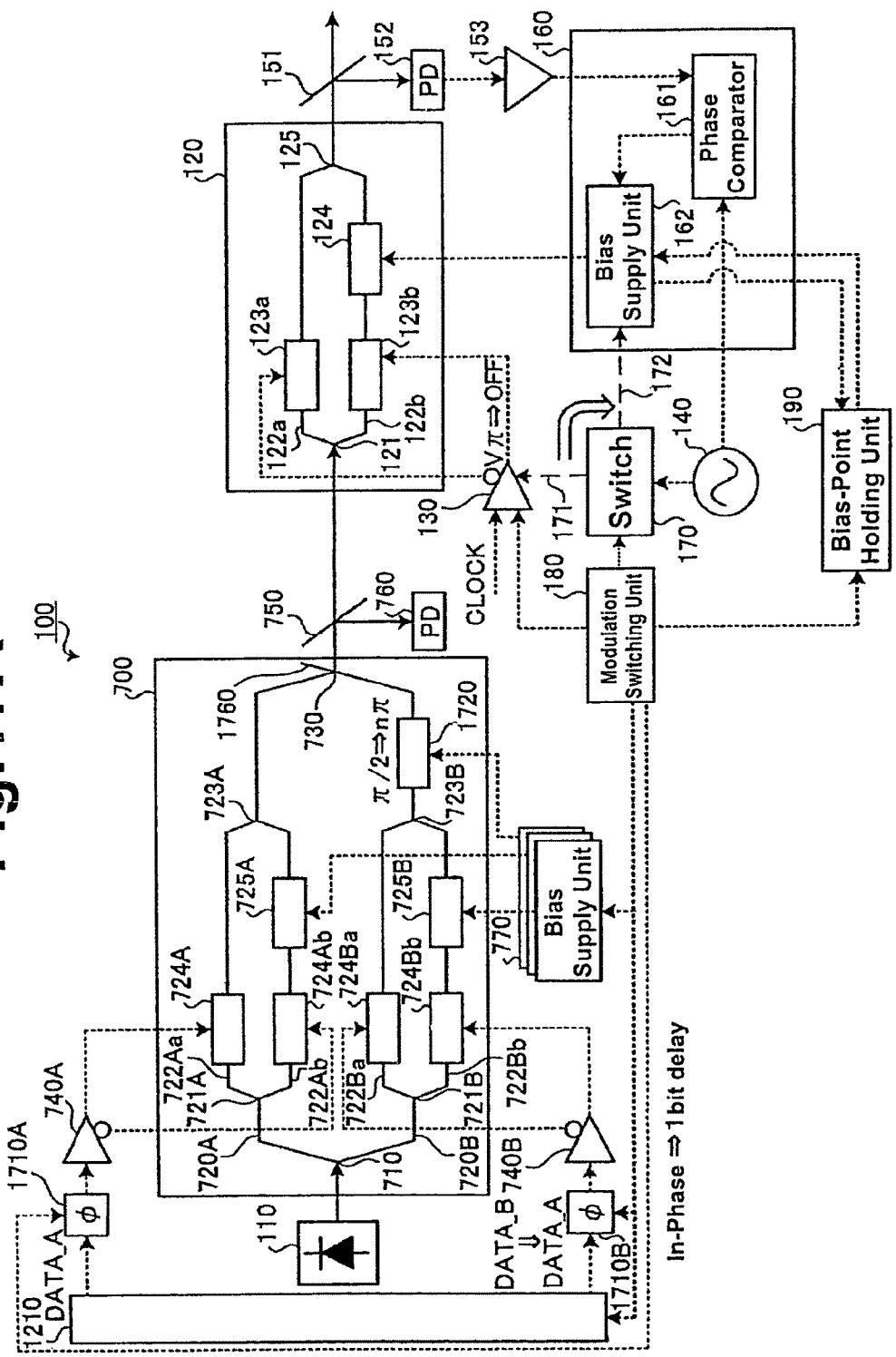

OPTICAL MODULATION DEVICE AND OPTICAL MODULATION METHOD

CROSS REFERENCE TO RELATED APPLICATIONS

This application is a continuation application of U.S. application Ser. No. 12/058,406, filed Mar. 28, 2008 now U.S. Pat. No. 7,773,283, now allowed, which further is based on and claims the benefit of priority from the prior Japanese Patent Application No. 2007-088622, filed on Mar. 29, 2007, the contents of which are hereby incorporated by reference.

BACKGROUND OF THE INVENTION

The present invention relates to an optical modulator using a Mach Zehnder modulator and a light-modulation switching method.

Recently, in association with a rapid increase in amount of information, large capacity and long distance of an optical communication system is required. For example, an optical amplification repeating system of 40 Gb/s has been put into practical use. In the future, the larger capacity and the long distance will be further required. A TDM (Time Division Multiplexing) system and a WDM (Wavelength Division Multiplexing) system have been researched and developed.

With respect to an electro-optical modulator circuit in an optical communication system, an intensity modulation (direct modulation) is the most simple. In this modulation, light emission/quenching is controlled by directly turning on/off current flowing to a semiconductor laser in response to "0" and "1" of a data signal. However, the laser is directly turned on/off and the property of a semiconductor then causes chirping in an optical signal.

As a bit rate is higher, the chirping affects a harmful influence to transmission characteristics. Because an optical fiber has a property of wavelength division that signal light having different wavelengths has different propagation rates. The direct modulation causes the chirping, then the propagation rate is delayed and waveforms deteriorate during transmission through the optical fiber and the long-distance transmission and the fast transmission are not possible.

Therefore, in transmission at fast rates of 2.5 Gb/s and 10 Gb/s, such an external modulation is performed that a laser diode continuously emits light and an external modulator turns on/off continuous light generated from the laser diode on the basis of "0" and "1" of the data signal. As the external modulator, a Mach Zehnder (MZ) optical modulator is mainly used.

FIG. 20 is a block diagram showing the structure of a conventional optical modulator. Referring to FIG. 20, a conventional optical modulator 2000 comprises: a light source 2010; a MZ modulator 2020; and a MZ modulator 2030. The MZ modulator 2020 is a DQPSK (Differential Quadrature Phase Shift Keying) modulator that modulates carrier light output from the light source 2010 to a differential quadrature phase thereof.

The MZ modulator 2020 comprises two MZ modulators (I arm 2020A and Q arm 2020B), and performs the DQPSK by interference of the signal light phase-modulated by the MZ modulators with the phase difference of $\pi/2$. A bias supply unit 2021 supplies, to the MZ modulator 2020, a bias voltage corresponding to the DQPSK signal modulated by the MZ modulator 2020.

The MZ modulator 2030 is an RZ modulator that converts the signal light subjected to the DQPSK modulated by the MZ modulator 2020 into RZ (Return to Zero) pulses. A bias control unit 2031 supplies a bias voltage corresponding to the signal light subjected to the RZ-DQPSK modulated by the MZ modulator 2030 to MZ modulator 2030.

In addition to the RZ-DQPSK, external modulators using various-modulations are used in accordance with transmission conditions, e.g., an NRZ (Non Return to Zero) intensity modulation, CZRZ-DQPSK (Carrier Suppressed RZ-DQPSK) modulation, and Duobinary (Alternate mark inversion) modulation (refer to Japanese Laid-open Patent Publication No. 2000-162563 and Japanese Laid-open Patent Publication No. H3-251815).

For example, the RZ-DQPSK is advantageous to the long-distance transmission because of high proof strength of Polarization Mode Dispersion (PMD) and high Optical Signal Noise Ratio (OSNR) in oncoming transmission and reception. However, the spectrum of the signal light is wide.

Therefore, in the case of a small interval between wavelengths in a WDM transmission system comprising a repeater including a wavelength division multiplexing device, the signal is cut-off by the wavelength division multiplexing device, thereby increasing the penalty. Accordingly, the DQPSK or DPSK can be used in a short WDM-transmission path with a small interval between wavelengths and a transmission path through which a nonlinear optical effect is frequently caused.

However, with the above-mentioned conventional arts, the modulation is fixed depending on the type of modulator and the initial setting. Therefore, even if changing the transmission conditions of the optical communication system, such as the interval between the wavelengths in the WDM and the number of steps of the repeater, the modulation is not switched corresponding to the changed transmission condition. As a consequence, there is a program that transmission characteristics deteriorate depending on the transmission condition.

Further, if one optical communication system uses modulations varied depending on optical communication devices, the modulation needs to be matched to the optical communication device as the communication destination. However, the conventional arts cannot switch the modulation to that matching to the optical communication device as the communication destination. Therefore, there is a problem that the optical transmission is not possible between the optical communication devices using different modulations.

On the other hand, it is considered that a plurality of modulators corresponding to the modulations are arranged to switch a plurality of modulations. However, the arrangement of a plurality of modulators causes a problem of a large scale, a complicated structure, and an increase in costs of the device. Further, upon switching the modulation by manually switching the modulator, the switching of the modulator is troublesome. Therefore, there is a problem that it is not possible to flexibly cope with the optical communication system in which the transmission condition frequently changes.

SUMMARY OF THE INVENTION

It is an object of an aspect of present invention is to provide an optical modulation device which is available to modulate with plurality of modulation format.

According to an aspect of an embodiment, an optical modulation device includes a Mach-Zehnder modulator and a controller. The Mach-Zehnder modulator is supplied a drive signal and a bias voltage. The Mach-Zehnder modulator modulates inputted light on the bases of the drive signal and the bias voltage. The drive signal selectively is superimposes a predetermined frequency signal. The bias voltage is selectively superimposed the predetermined frequency signal. The controller selects a superimposing target which is the drive signal or the bias voltage so as to change modulation formats.

BRIEF DESCRIPTION OF THE DRAWINGS

These and other objects and advantages of the present invention will become more apparent and more readily appreciated from the following description of the preferred embodiments, taken in conjunction with the accompanying drawings of which:

FIG. 17A is a block diagram showing an optical modulator according to the sixth embodiment.

DETAILED DESCRIPTION OF THE PREFERRED EMBODIMENT

Hereinbelow, a detailed description will be given of an optical modulator device and an optical modulator device switching method according to embodiments with reference to the attached drawings.

First Embodiment

Figure 1:
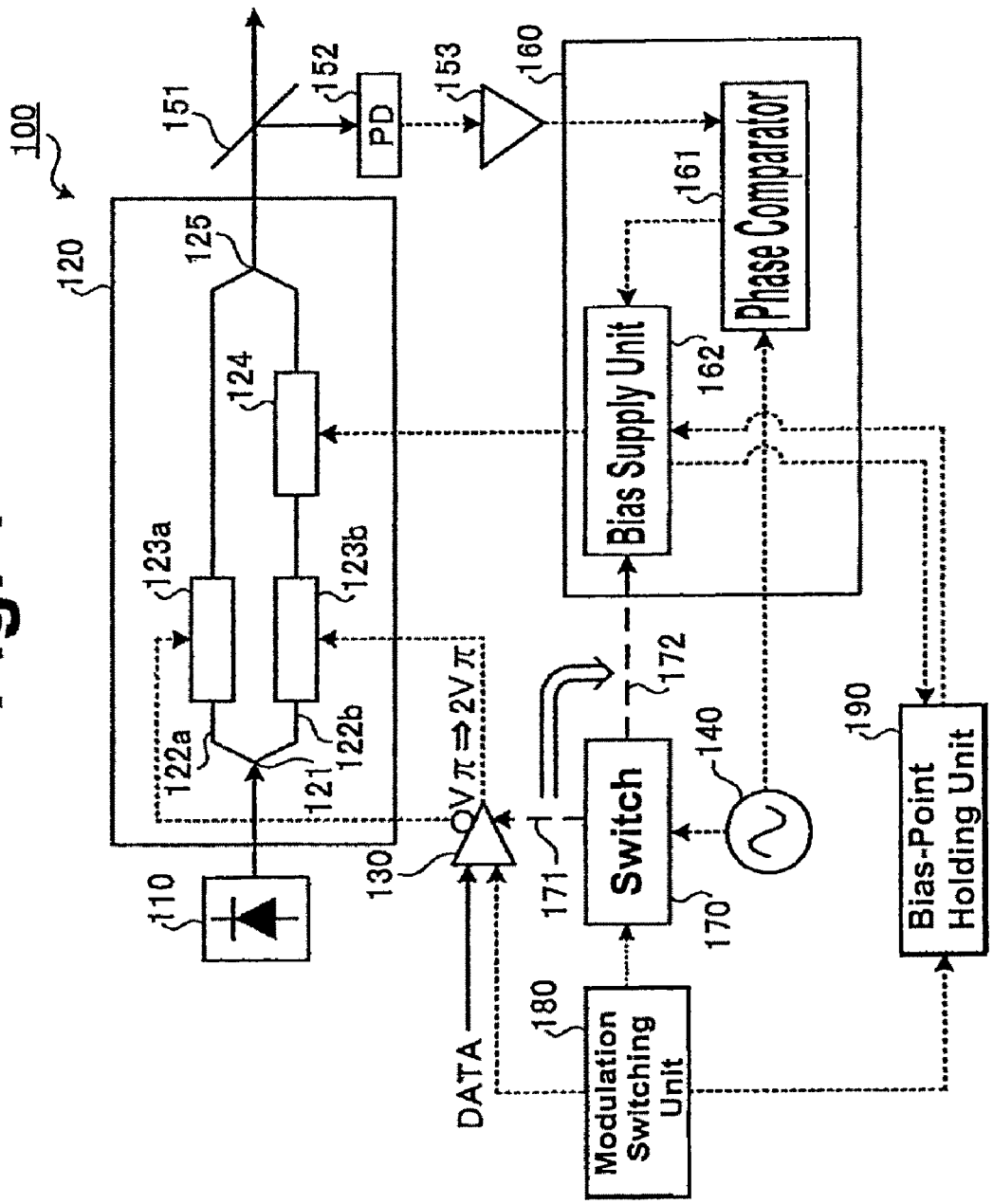
FIG. 1 is a block diagram showing an optical modulator according to the first embodiment.

FIG. 1 is a block diagram showing the structure of an optical modulator according to the first embodiment. In FIG. 1, a solid arrow shows a light flow and a dotted arrow shows an electrical flow (similarly in the following block diagrams). An optical modulation device 100 according to the first embodiment is an optical modulator that can switch the DPSK and the NRZ intensity modulation format in accordance with modulation switching information.

Referring to FIG. 1, the optical modulation device 100 comprises: a light source 110; a Mach-Zehnder modulator (MZ modulator) 120; a driving unit (driving circuit) 130; an oscillator 140; a branch unit 151; a light receiving unit 152 (PD); an amplifying unit 153; a bias control unit 160; a switch 170; a modulation switching unit (controller) 180; and a bias-point holding unit 190. The light source 110 generates continuous light as carrier light and outputs the generated continuous light to the MZ modulator 120.

The MZ modulator 120 performs NRZ intensity modulation of the continuous light output from the light source 110 on the basis of a drive signal output from the driving unit 130. Specifically, the MZ modulator 120 contains a basic material having an electro-optical effect, such as LiNbO3, and comprises: a branch unit 121; an optical waveguide 122a; an optical waveguide 122b; and a coupling unit 125.

The branch unit 121 branches the continuous light output from the light source 110, and outputs one branched piece of the continuous light to the optical waveguide 122a, and further outputs the other branched piece of the continuous light to the optical waveguide 122b. The optical waveguide 122a comprises a phase modulating section 123a. The phase modulating section 123a performs binary phase-modulation of the light passing through the optical waveguide 122a in accordance with the drive signal output from the driving unit 130.

The optical waveguide 122b comprises: a phase modulating section 123b and a phase modulating section 124. The phase modulating section 123b performs binary phase-modulation of the light passing through the optical waveguide 122b in accordance with the drive signal output from the driving unit 130. The phase modulating section 124 performs phase modulation of light passing through the optical waveguide 122b in accordance with the bias voltage supplied from a bias supply unit 162.

The coupling unit 125 couples (performs interference of) the light passing through the optical waveguide 122a and the light passing through the optical waveguide 122b and outputs the coupled light to the branch unit 151. The driving unit 130 inputs a data signal (DATA), and outputs the input data signal as a drive signal to the MZ modulator 120. Further, the driving unit 130 changes, to $2V\pi$ or $V\pi$, a voltage of the drive signal to be output to the MZ modulator 120 under the control of the modulation switching unit 180.

The driving unit 130 performs push-pull modulation for always outputting drive signals with inverse signs to, e.g., the phase modulating section 123a and the phase modulating section 123b in the MZ modulator 120. Herein, an output from one driver is differential-operated, thereby driving the modulator. However, two drivers may be used, thereby driving the modulator. Further, upon outputting a low-frequency signal from the switch 170, the driving unit 130 superimposes the low-frequency signal to the drive signal to be output to the MZ modulator 120.

The oscillator 140 oscillates a low-frequency signal of a frequency f0 (predetermined frequency). The low-frequency signal oscillated by the oscillator 140 is a signal with a frequency much lower than the frequency of the drive signal output by the driving unit 130, e.g., a signal of a frequency 1 kHz. The oscillator 140 outputs the oscillated low-frequency signal to the switch 170. Further, the oscillator 140 outputs the oscillated low-frequency signal to a phase comparator 161 of the bias control unit 160.

The branch unit 151 branches a part of the signal light output from the MZ modulator 120, and outputs the branched light to the light receiving unit 152. The light receiving unit 152 receives the signal light output from the branch unit 151, and converts the received light into an electrical signal. The light receiving unit 152 outputs the converted electrical signal to the amplifying unit 153. The light receiving unit 152 is, e.g., a PD (Photo Diode). The amplifying unit 153 amplifies the electrical signal output from the light receiving unit 152, and outputs the amplified signal to the bias control unit 160.

The bias control unit 160 supplies, to the MZ modulator 120, a bias voltage corresponding to the component of the frequency f0 included in the signal light modulated by the MZ modulator 120. The bias control unit 160 comprises the phase comparator 161 and the bias supply unit 162. The phase comparator 161 extracts the component of the frequency f0 included in the electrical signal output from the amplifying unit 153 with synchronous detection based on the low-frequency signal output from the oscillator 140.

For example, the phase comparator 161 is a multiplying circuit that multiplies the electrical signal output from the amplifying unit 153 and the low-frequency signal output from the oscillator 140. In this case, the phase comparator 161 outputs, to the bias supply unit 162, a DC voltage corresponding to the intensity and phase of the frequency f0, as the multiplying result of the electrical signal and the low-frequency signal.

The bias supply unit 162 supplies the bias voltage to the MZ modulator 120. Further, the bias supply unit 162 controls the bias voltage to be supplied to the MZ modulator 120 so as to minimize the intensity of the component of the frequency f0 output from the phase comparator 161. Further, the bias supply unit 162 outputs control information on the bias point corresponding to the modulation to the bias-point holding unit 190.

The control information on the bias point corresponding to the modulation is, e.g., information on the direction for controlling the bias voltage supplied to the MZ modulator 120 upon switching the modulation. Further, the bias supply unit 162 controls the bias voltage supplied to the MZ modulator 120 on the basis of the control information on the bias point and the component of the frequency f0 upon outputting the control information on the bias point from the bias-point holding unit 190.

Further, the bias supply unit 162 superimposes the low-frequency signal to the bias voltage to be supplied to the MZ modulator 120, upon outputting the low-frequency signal from the switch 170. The switch 170 switches, under the control from the modulation switching unit 180, a first path 171 for outputting the low-frequency signal output from the oscillator 140 to the driving unit 130 and a second path 172 for outputting the low-frequency signal output from the oscillator 140 to the bias supply unit 162 in the bias control unit 160.

The modulation switching unit 180 (controller) obtains the modulation switching information (modulation format information changing information) by an input from a user. The modulation switching unit 180 controls the voltage of the drive signal output from the driving unit 130 and the paths in the switch 170 in accordance with the obtained modulation switching information. Further, the modulation switching unit 180 outputs control information on the switching to the modulation matching the obtained modulation switching information to the bias-point holding unit 190.

Specifically, upon obtaining the modulation switching information indicating the switching from the NRZ intensity modulation to the DPSK, the modulation switching unit 180 controls, to 2Vπ, the voltage of the drive signal to be output from the driving unit 130 to the MZ modulator 120, and switches the switch 170 to the second path 172. As a consequence, the MZ modulator 120 is operated as a DPSK modulator.

Further, upon obtaining the modulation switching information indicating the switching from the DPSK to the NRZ intensity modulation, the modulation switching unit 180 controls, to Vπ, the voltage of the drive signal to be output from the driving unit 130 to the MZ modulator 120, and switches the switch 170 to the first path 171. As a consequence, the MZ modulator 120 is operated as an NRZ intensity modulation.

Furthermore, upon obtaining the modulation switching information indicating the switching from the NRZ intensity modulation to the DPSK, the modulation switching unit 180 outputs the control information on the switching to the DPSK to the bias-point holding unit 190. In addition, upon obtaining the modulation switching information indicating the switching from the DPSK to the NRZ intensity modulation, the modulation switching unit 180 outputs the control information on the switching to the NRZ intensity modulation to the bias-point holding unit The bias-point holding unit 190 holds the control information on the bias-point corresponding to the modulation output from the bias supply unit 162 in the bias control unit 160. Further, the bias-point holding unit 190 outputs, to the bias supply unit 162 in the bias control unit 160, the control information on the bias point in accordance with the modulation corresponding to the switching control information output from the modulation switching unit 180.

Figure 2:
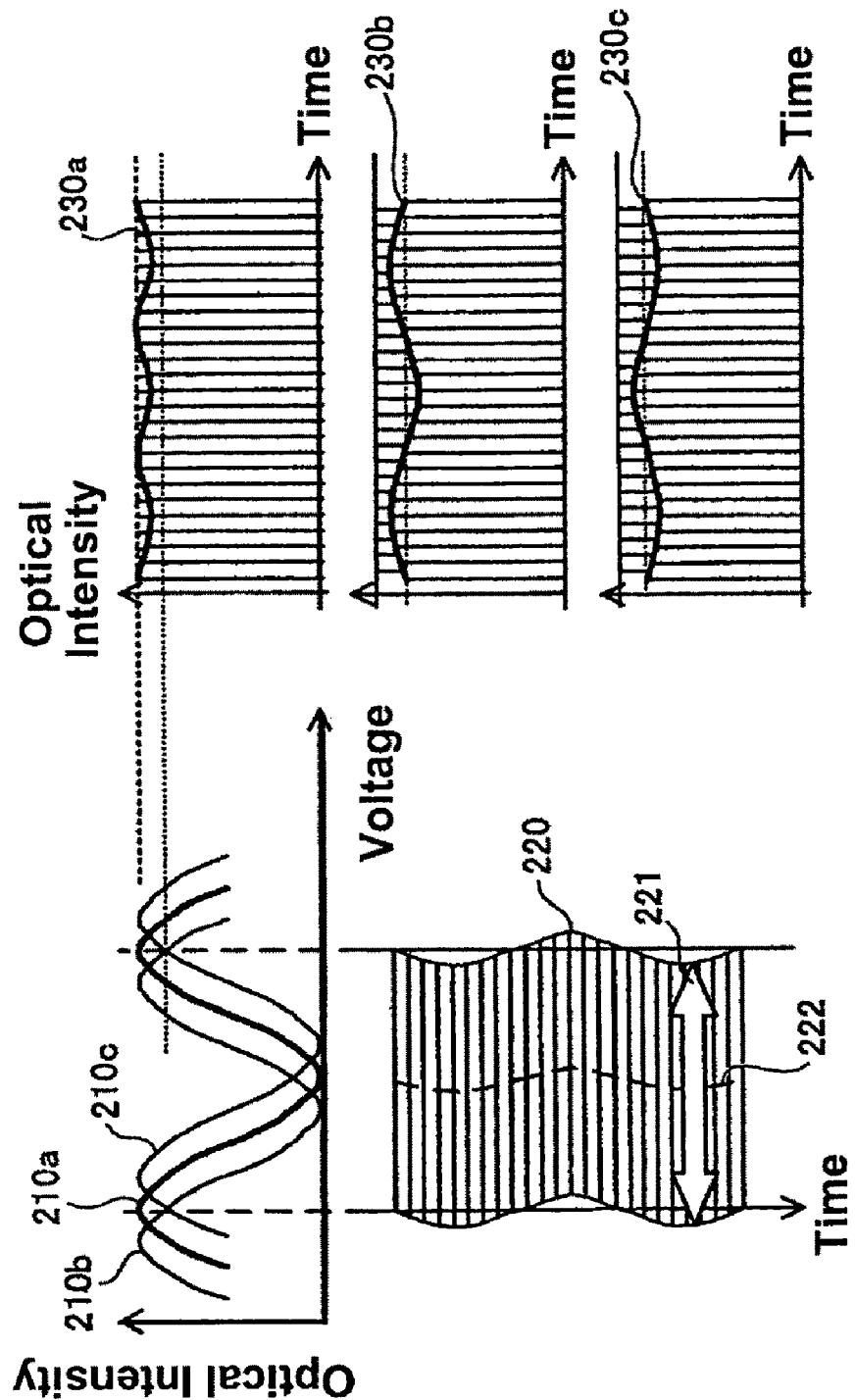
FIG. 2 is a diagram showing input/output characteristics (of DPSK) of a MZ modulator.

FIG. 2 is a diagram showing input/output characteristics (of DPSK format) of the MZ modulator. Referring to FIG. 2, reference numeral 210 (210a to 210c) denotes input/output characteristics of the MZ modulator 120. In the input/output characteristics 210, the abscissa denotes the voltage of the drive signal to be output from the driving unit 130 to the MZ modulator 120, and the ordinate denotes the optical intensity of the signal light to be output from the MZ modulator 120.

As shown by the input/output characteristics 210, the optical intensity of the signal light to be output from the MZ modulator 120 is periodic to the voltage of the drive signal. In the input/output characteristics 210, Vπ is a voltage (half-wavelength voltage) for changing the optical intensity of the signal light to be output from the MZ modulator 120 by a half period, and 2Vπ is a voltage for changing the optical intensity of the signal light by one period.

In the MZ modulator 120, a substrate itself is polarized by the change in temperature of the basic material $LiNbO_3$, applying an electrical field for a long time, and the change in ages, and charges remain on the substrate surface. Therefore, the bias voltage changes between the optical waveguide 122a and the optical waveguide 122b in the MZ modulator 120, thereby also changing the input/output characteristics 210 of the MZ modulator 120.

The input/output characteristics 210a represent ideal input/output characteristics of the MZ modulator 120. The input/output characteristics 210b and input/output characteristics 210c represent input/output characteristics changed (obtained by drifting an operation point) from the ideal input/output characteristics 210a of the MZ modulator 120. The input/output characteristics 210b specifically represent input/output characteristics obtained by drifting the operation point toward the negative direction. The input/output characteristics 210c specifically represent input/output characteristics obtained by drifting the operation point toward the positive direction.

Reference numeral 220 denotes a voltage applied to the MZ modulator 120 as a result of outputting the drive signal and the bias voltage to the MZ modulator 120. In the applied voltage 220, the abscissa denotes a voltage applied to the MZ modulator 120, corresponding to the abscissa of the input/output characteristics 210 of the MZ modulator 120, and the ordinate denotes time.

Upon obtaining the modulation switching information indicating the switching to the DPSK format, the modulation switching unit 180 controls, to $2V\pi$, the voltage of the drive signal as mentioned above, and switches the switch 170 to the second path 172, thereby superimposing the low-frequency signal of the frequency f0 to the bias voltage. Reference numeral 221 denotes the voltage of the drive signal ($2V\pi$) output from the driving unit 130.

Reference numeral 222 denotes a central value (bias point) of the voltage applied to the MZ modulator 120. The bias point 222 is controlled by a bias voltage output from the bias supply unit 162. In the case of the DPSK format, the bias point 222 is set to a voltage as a valley of the input/output characteristics 210 (quenching state).

The bias point 222 is set to the valley of the input/output characteristics 210, and the voltage of the drive signal 221 is $2V\pi$. Accordingly, when the drive signal indicates both "0" and "1", the intensity of the signal light is "1" (light emission state). Herein, when the drive signal indicates "0" (interference at the phase difference of 0) and "1" (interference at the phase difference of $2\pi$), the phases of the signal light output from the MZ modulator 120 are different from each other by $\pi$.

Therefore, the signal light output from the MZ modulator 120 becomes DPSK signal light with the phase of 0 or $\pi$ depending on the drive signal indicating "0" or "1". Further, since the low-frequency signal of the frequency f0 is superimposed to a bias electrode, the voltage 220 applied to the MZ modulator 120 changes by the frequency f0.

Reference numeral 230 (230a to 230c) denotes signal light output from the MZ modulator 120 in the case of the DPSK. In the signal light 230, the abscissa denotes time, and the ordinate denotes the intensity of the signal light output from the MZ modulator 120. The signal light 230a, 230b, and 230c denotes signal light when input/output characteristics of the MZ modulator 120 are respectively the input/output characteristics 210a, 210b, and 210c When the input/output characteristics 210 of the MZ modulator 120 are the input/output characteristics 210a, the voltage 220 applied to the MZ modulator 120 passes a peak portion (minimum or maximum light-intensity) of the input/output characteristics 210a each time when the applied voltage 220 changes by the frequency f0. Therefore, the change of the frequency f0 of the applied voltage 220 is output as a change in frequency f0×2 of the intensity of the signal light 230a, and the signal light 230a does not include the component of the frequency f0.

When the input/output characteristics 210 of the MZ modulator 120 are the input/output characteristics 210b, the voltage 220 applied to the MZ modulator 120 changes by the frequency f0 on the high-voltage side, rather than the peak portion of the input/output characteristics 210b. Therefore, the change of the frequency f0 of the applied voltage 220 is output as a change in frequency f0 of the intensity of the signal light 230b, and the signal light 230b includes the component of the frequency f0.

When the input/output characteristics 210 of the MZ modulator 120 are the input/output characteristics 210c, the voltage 220 applied to the MZ modulator 120 changes by the frequency f0 on the low-voltage side, rather than the peak portion of the input/output characteristics 210c. Therefore, the change in frequency f0 of the applied voltage 220 is output as a change in frequency f0 of the intensity of the signal light 230c, and the signal light 230c includes the component of the frequency f0.

When the signal light output from the MZ modulator 120 does not include the component of the frequency f0, it is determined that the input/output characteristics 210 are the input/output characteristics 210a. In this case, the bias supply unit 162 in the bias control unit 160 keeps the bias voltage to be supplied to the MZ modulator 120.

Further, when the input/output characteristics 210 of the MZ modulator 120 are the input/output characteristics 210b and the input/output characteristics 210c, the phases of the component of the frequency f0 of the intensity of the signal light inverse each other. Therefore, when the signal light includes the component of the frequency f0, it is determined by using the phase of the component of the frequency f0 whether the input/output characteristics 210 are the input/output characteristics 210b or the input/output characteristics 210c.

When the input/output characteristics 210 are the input/output characteristics 210b, the bias supply unit 162 in the bias control unit 160 shifts the bias point 222 to the high-voltage side by increasing the bias voltage to be supplied to the MZ modulator 120. When the input/output characteristics 210 are the input/output characteristics 210c, the bias supply unit 162 in the bias control unit 160 shifts the bias point 222 to the low-voltage side by reducing the bias voltage to be supplied to the MZ modulator 120.

Figure 3:
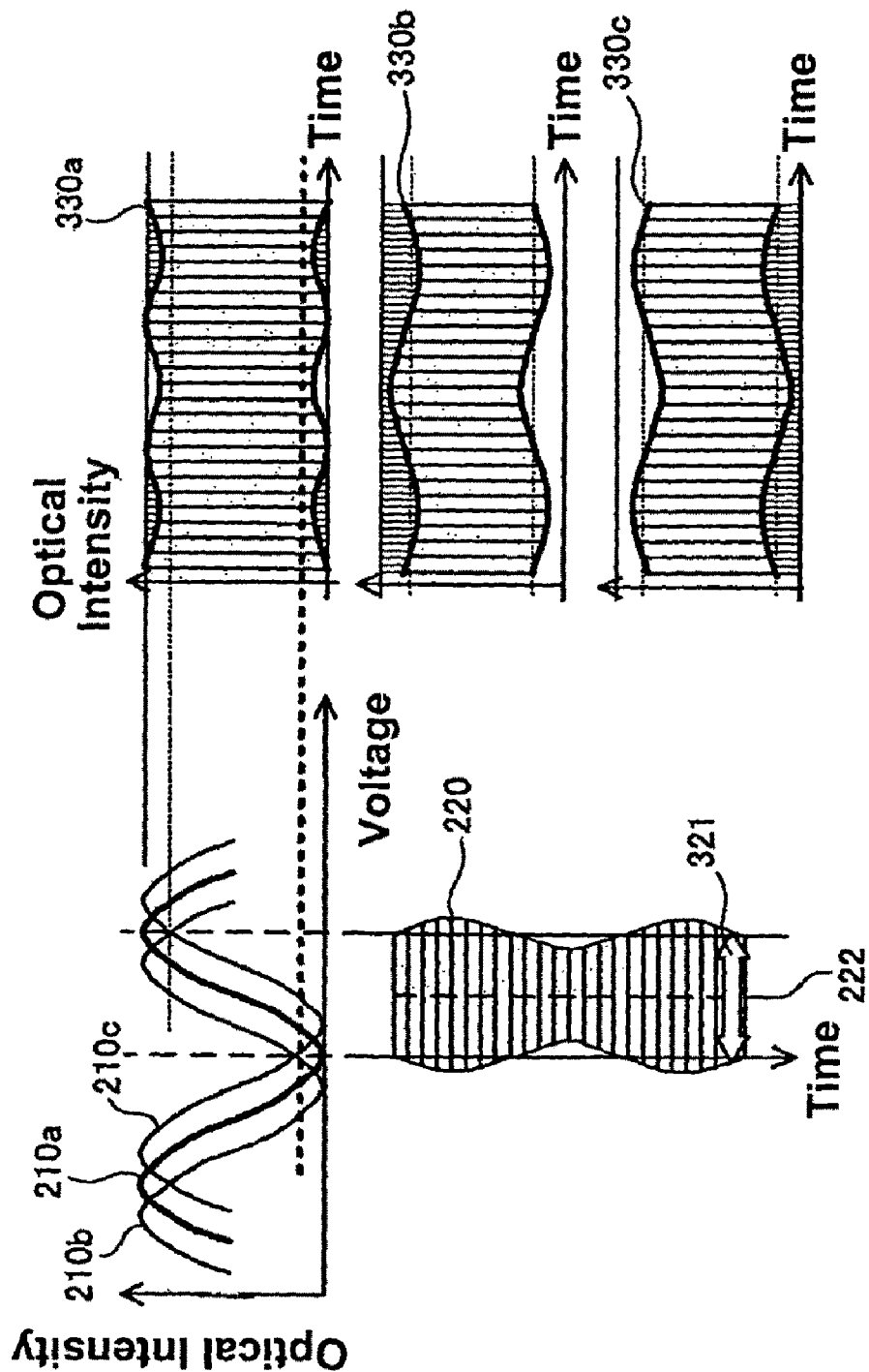
FIG. 3 is a diagram showing input/output characteristics (of NRZ intensity modulation) of the MZ modulator.

FIG. 3 is a diagram showing the input/output characteristics (of NRZ intensity modulation format) of the MZ modulator. Referring to FIG. 3, the same portions as those shown in FIG. 2 are designated by the same reference numerals and a description thereof is omitted. Upon obtaining the modulation switching information indicating the switching to the NRZ intensity modulation, the modulation switching unit 180 controls, to $V\pi$, the voltage of the drive signal as mentioned above, and switches the switch 170 to the first path, thereby superimposing the low-frequency signal of the frequency f0 to the drive signal.

Reference numeral 321 denotes the voltage of the drive signal ($V\pi$) output from the driving unit 130. In the NRZ intensity modulation, the bias point 222 is set to a voltage as the center between peak portions of the input/output characteristics 210. Herein, the bias point 222 is set to the center between the peak portions of the input/output characteristics 210, serving as a voltage having a positive differential value of the input/output characteristics 210.

Since the bias point 222 is set to the center between a valley (quenching state) and a peak (light emission state) of the input/output characteristics 210 of the input/output characteristics 210 and the voltage of the drive signal 221 is $V\pi$, when the drive signal indicates "0", the intensity of the signal light is "0" (quenching state). Further, when the drive signal indicates "1", the intensity of the signal light is "1" (light emission state).

Therefore, depending on as whether the drive signal indicates "0" or "1", the signal light output from the MZ modulator 120 becomes signal light in binary NRZ intensity modulation having the intensity of "0" or "1". Further, the low-frequency signal of the frequency f0 is superimposed to the drive signal. Thus, similarly to the case in which the driving unit 130 superimposes the low-frequency signal of the frequency f0 to the drive signal, the voltage 220 applied to the MZ modulator 120 always changes by the frequency f0.

Reference numeral 330 (330a to 330c) denotes signal light output from the MZ modulator 120 in the NRZ intensity modulation. The signal light 330a, 330b, and 330c denotes signal light when the input/output characteristics 210 of the MZ modulator 120 are respectively the input/output characteristics 210a, 210b, and 210c.

Similarly to the DPSK (refer to reference numeral 230 in FIG. 2), when the input/output characteristics 210 are the input/output characteristics 210a, the signal light 330a does not include the component of the frequency f0. When the input/output characteristics 210 are the input/output characteristics 210b or 210c, the signal light 330b includes the component of the frequency f0. Further, depending on as whether the input/output characteristics 210 are the input/output characteristics 210b or the input/output characteristics 210c, the phase of the component of the frequency f0 of the intensity of the signal light inverses.

Figure 4:
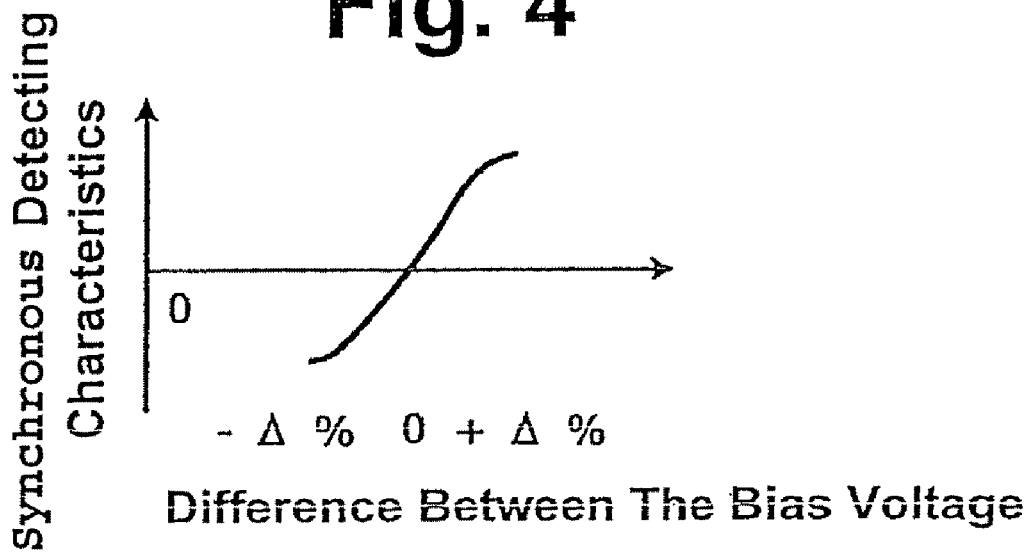
FIG. 4 is a graph showing synchronous detecting characteristics of a bias control unit.

FIG. 4 is a graph showing synchronous detecting characteristics of the bias control unit. Referring to FIG. 4, the abscissa denotes the difference between the bias voltage to be supplied to the MZ modulator 120 by the bias supply unit 162 and the best bias voltage when the input/output characteristics 210 become the input/output characteristics 210a, and the ordinate denotes synchronous detecting characteristics output from the phase comparator 161.

Referring to FIG. 4, when the difference between the bias voltage to be supplied by the bias supply unit 162 and the best bias voltage is 0 and the input/output characteristics 210 thus become the input/output characteristics 210a, the signal light (the signal light 230a and 330a) output from the MZ modulator 120 does not include the component of the frequency f0. Therefore, the synchronous detecting characteristics output from the phase comparator 161 are 0.

Further, when the input/output characteristics 210 are the input/output characteristics 210b (−Δ%) since the bias voltage to be supplied by the bias supply unit 162 is much lower, the signal light (the signal light 230b and 330b) output from the MZ modulator 120 includes the component of the frequency f0, and the phase of the component of the frequency f0 is inverse to a phase of the low-frequency signal output from the oscillator 140. Therefore, the synchronous detecting characteristics output from the phase comparator 161 have a negative value.

Further, when the input/output characteristics 210 are the input/output characteristics 210c (+Δ%) since the bias voltage to be supplied by the bias supply unit 162 is much higher, the signal light (the signal light 230c and 330c) output from the MZ modulator 120 includes the component of the frequency f0, and the phase of the component of the frequency f0 has the same phase as that of the low-frequency signal output from the oscillator 140. Therefore, the synchronous detecting characteristics output from the phase comparator 161 have a positive value.

The bias supply unit 162 in the bias control unit 160 controls the bias voltage to be supplied to the MZ modulator 120, depending on the synchronous detecting characteristics output from the phase comparator 161. Specifically, when the synchronous detecting characteristics are 0, the bias supply unit 162 keeps the bias voltage to be supplied to the MZ modulator 120.

Further, when the synchronous detecting characteristics have the negative value, the bias supply unit 162 increases the bias voltage to be supplied to the MZ modulator 120, thereby shifting the bias point 222 to the high-voltage side. As a consequence, the input/output characteristics 210 of the MZ modulator 120 are controlled from the input/output characteristics 210b to the input/output characteristics 210a.

Furthermore, when the synchronous detecting characteristics have the positive value, the bias supply unit 162 reduces the bias voltage to be supplied to the MZ modulator 120, thereby shifting the bias point 222 to the low-voltage side. As a consequence, the input/output characteristics 210 of the MZ modulator 120 are controlled from the input/output characteristics 210c to the input/output characteristics 210a.

Figure 5:
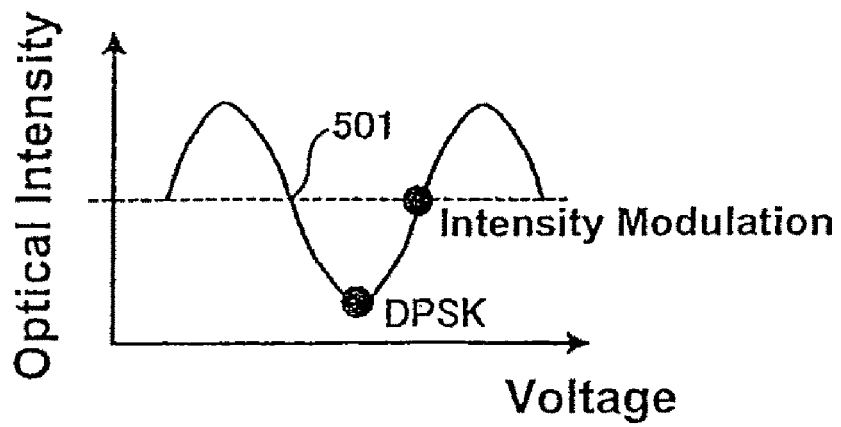
FIG. 5 is a diagram showing bias points of the MZ modulator (in DPSK and NRZ intensity modulation).

FIG. 5 is a diagram showing bias points of the MZ modulator (in DPSK format and NRZ intensity modulation format). Referring to FIG. 5, in the DPSK, the bias point 222 is set to a voltage as a valley (quenching state) of the input/output characteristics 210. In the NRZ intensity modulation, the bias point 222 is at the center between the valley (quenching state) and the peak (light emission state) of the input/output characteristics 210, and is set to a value having a differential value of the input/output characteristics 210 as the positive value.

Upon switching the NRZ intensity modulation to the DPSK, the control information on the bias point corresponding to the modulation held by the bias-point holding unit 190 includes information for controlling the bias voltage to be supplied to the MZ modulator 120 in the negative direction. Further, upon switching the DPSK to the NRZ intensity modulation, the control information on the bias point corresponding to the modulation held by the bias-point holding unit 190 includes information for controlling the bias voltage to be supplied to the MZ modulator 120 in the positive direction.

The control information on the bias point corresponding to the modulation held by the bias-point holding unit 190 may be information for every modulation of the bias voltage value when the bias point 222 is the best one. The information for every modulation of the bias voltage value indicates a value of the bias voltage to be supplied to the MZ modulator 120 upon switching the modulation to the DPSK and upon switching the modulation to the NRZ intensity modulation.

Further, the information for every modulation of the bias voltage value includes information indicating that the bias voltage to be supplied to the MZ modulator 120 is reduced by $V\pi/4$ in the switching from the NRZ intensity modulation to the DPSK, and information indicating that the bias voltage to be supplied to the MZ modulator 120 is increased by $V\pi/4$ in the switching from the DPSK to the NRZ intensity modulation.

When the control information on the bias point corresponding to the modulation is the information for every modulation of the bias voltage value, the bias supply unit 162 controls the bias voltage on the basis of the information for every modulation of the bias voltage value, thereby setting the bias point 222 corresponding to the switching of the modulation. Thereafter, the bias supply unit 162 controls the bias voltage on the basis of the component of the frequency f0 output from the phase comparator 161, thereby setting the bias point 222 corresponding to the change in input/output characteristics 210 of the MZ modulator 120.

In the NRZ intensity modulation, the bias point 222 is set to a voltage so that the differential value of the input/output characteristics 210 is positive, as mentioned above. Alternatively, in the NRZ intensity modulation, the bias point 222 may be set to a voltage so that the differential value of the input/output characteristics 210 is negative, as shown by reference numeral 501.

In this case, the change in intensity of the signal light inverses in response to the drive signal. Specifically, when the drive signal indicates "0", the intensity of the signal light is "1" (light emission state). Further, when the drive signal indicates "1", the intensity of the signal light is "0" (quenching state). In this case, the signal light output from the MZ modulator 120 is binary signal light of the NRZ intensity modulation.

Figure 6:
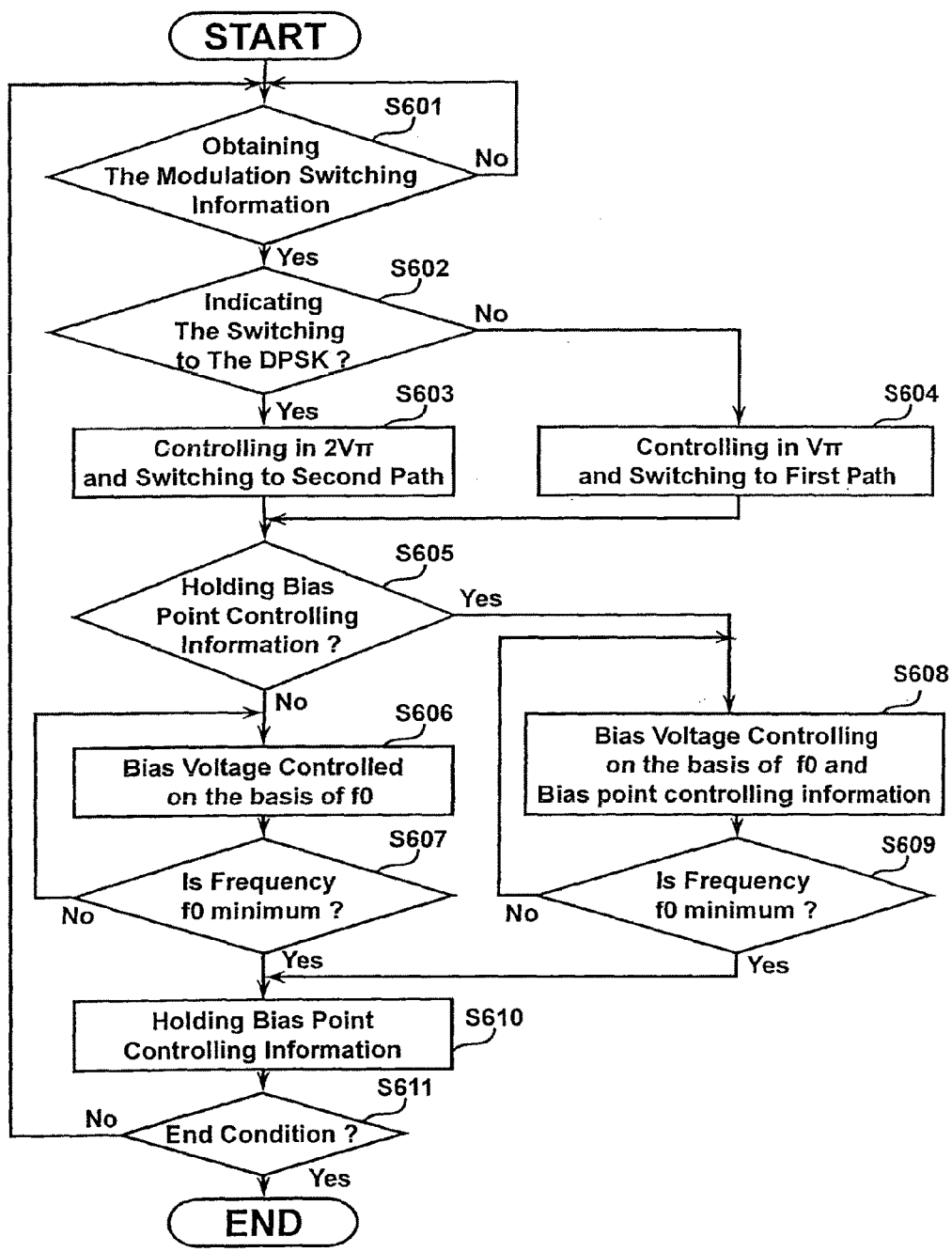
FIG. 6 is a flowchart showing an example of an operation of an optical modulator according to the first embodiment.

FIG. 6 is a flowchart showing an example of the operation of the optical modulator according to the first embodiment. Referring to FIG. 6, the modulation switching unit 180 is in a standby mode until obtaining the modulation switching information (in a loop of No in step S601). After obtaining the modulation switching information (Yes in step S601), it is determined whether or not the obtained modulation switching information is modulation switching information indicating the switching to the DPSK (in step S602).

When it is determined in step S602 that the obtained modulation switching information is the modulation switching information indicating the switching to the DPSK (Yes in step S602), the modulation switching unit 180 controls, to $2V\pi$, the voltage of the drive signal output from the driving unit 130 to the MZ modulator 120, and switches the switch 170 to the second path 172 (in step S603). Then, the processing shifts to step S605.

When it is determined in step S602 that the obtained modulation switching information is not the modulation switching information indicating the switching to the DPSK (No in step S602), the modulation switching unit 180 determines that the obtained modulation switching information is the modulation switching information indicating the switching to the NRZ intensity modulation, controls, to $V\pi$, the voltage of the drive signal output from the driving unit 130 to the MZ modulator 120, and switches the switch 170 to the first path 171 (in step S604). Then, the processing shifts to step S605.

Subsequently, the modulation switching unit 180 outputs, to the bias-point holding unit 190, the control information on the switching to the modulation corresponding to the modulation switching information determined in step S602. Further, the bias-point holding unit 190 determines whether or not to hold the control information on the bias point corresponding to the modulation indicated by the switching control information output from the modulation switching unit 180 (in step S605).

When it is determined in step S605 that the control information on the bias point corresponding to the modulation is not held (No in step S605), the bias-point holding unit 190 outputs, to the bias supply unit 162, information indicating that the control information on the bias point is not held. Further, the bias supply unit 162 controls the bias voltage on the basis of the component of the frequency f0 output from the phase comparator 161 (in step S606).

The bias supply unit 162 repeats step S606 until the intensity of the component of the frequency f0 output from the phase comparator 161 is minimum (No in step S607 and in a loop of step S606). When the intensity of the component of the frequency f0 output from the phase comparator 161 is minimum, (Yes in step S607), the processing shifts to step S610.

When it is determined in step S605 that the control information on the bias point corresponding to the modulation is held (Yes in step S605), the bias-point holding unit 190 outputs the control information on the bias point to the bias supply unit 162. Further, the bias supply unit 162 controls the bias voltage on the basis of the control information on the bias point output from the bias-point holding unit 190 and the component of the frequency f0 output from the phase comparator 161 (in step S608).

The bias supply unit 162 repeats step S608 until the intensity of the component of the frequency f0 output from the phase comparator 161 is minimum (No in step S609 and in a loop of step S608). When the intensity of the component of the frequency f0 output from the phase comparator 161 is minimum (Yes in step S609), the processing shifts to step S610.

Subsequently, the bias supply unit 162 outputs, to the bias-point holding unit 190, the control information on the bias point corresponding to the modulation. Further, the bias-point holding unit 190 holds the control information on the bias point output from the bias supply unit 162 (in step S610). Subsequently, it is determined whether or not an end condition of a series of operations is satisfied (in step S611). When the end condition is not satisfied (No in step S611), the processing shifts to step S601. When the end condition is satisfied (Yes in step S611), a series of operations end.

With the optical modulation device 100 according to the first embodiment as mentioned above, the drive signal and the path of the switch for the MZ modulator 120 are switched, thereby switching the DPSK and the NRZ intensity modulation. Therefore, even if changing the transmission condition of the optical communication system, the modulation can be switched to a modulation by which transmission characteristics do not deteriorate against the changed transmission condition.

Further, with the optical modulation device 100 according to the first embodiment, one MZ modulator 120 can switch the DPSK and the NRZ intensity modulation. Therefore, it is possible to decrease the size of the apparatus, simplify the apparatus, and reduce costs without arranging a plurality of modulators corresponding to modulations in order to change the modulation.

Furthermore, with the optical modulation device 100 according to the first embodiment, the modulation can be matched to the optical communication apparatus as the communication destination. Therefore, the optical transmission is possible with the optical communication apparatus using different modulations. Moreover, the modulation switching information is input, thereby automatically and immediately the modulation. Therefore, it is possible to flexibly cope with the optical communication system in which the transmission condition frequently change.

In addition, with the optical modulation device 100 according to the first embodiment, the bias-point holding unit 190 holds the control information on the bias point corresponding to the modulation, thereby efficiently controlling the bias voltage with the bias supply unit 162 in the switching of the modulation. Therefore, it is possible to reduce the time from the switching of the modulation to a stable state of transmission characteristics of the signal light.

Second Embodiment

Figure 7:
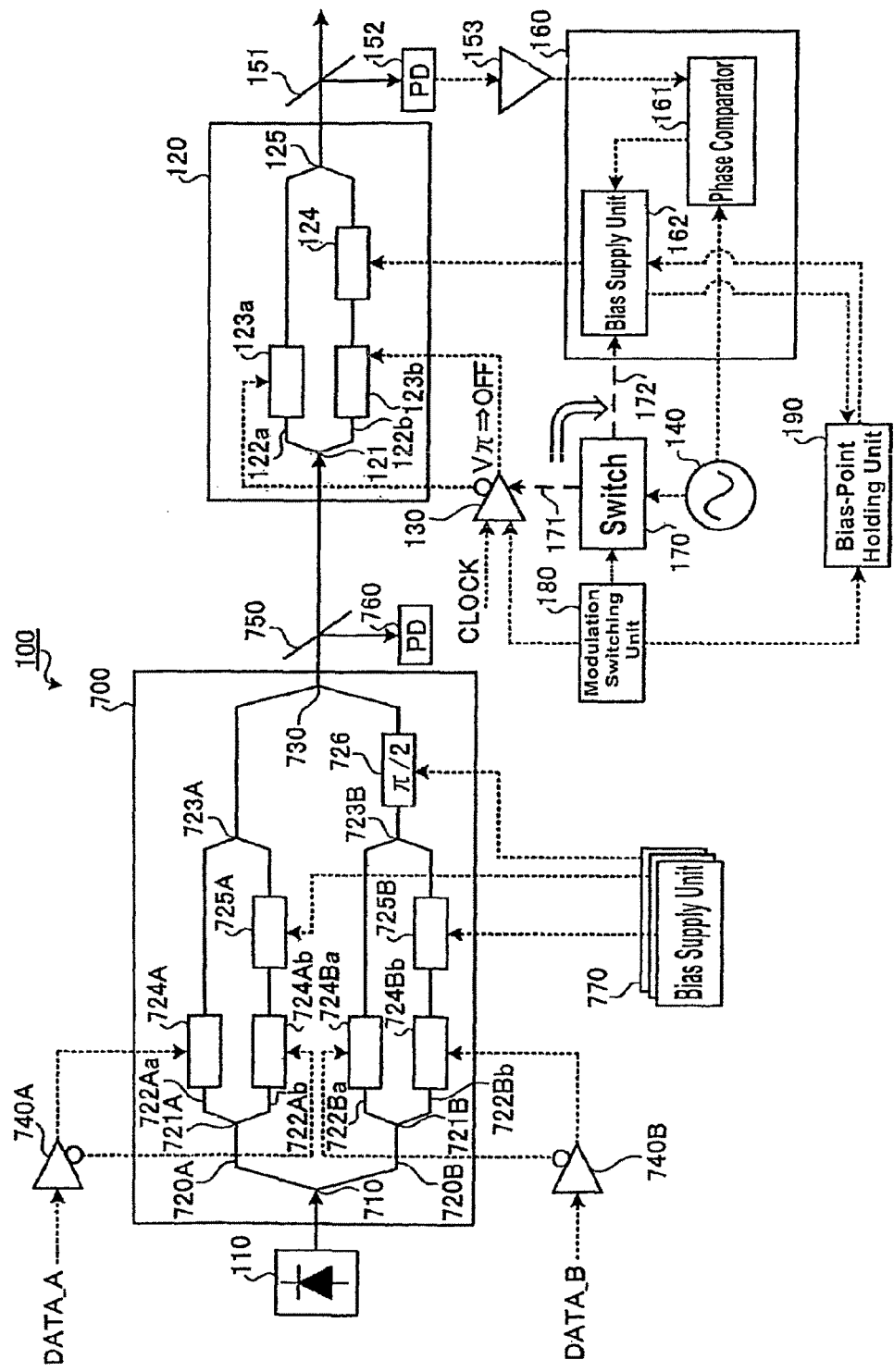
FIG. 7 is a block diagram showing the structure of an optical modulator according to the second embodiment.

FIG. 7 is a block diagram showing the structure of an optical modulator according to the second embodiment. Referring to FIG. 7, the same component as that shown in FIG. 1 is designated by the same reference numeral and a description thereof is omitted. An optical modulation device 100 according to the second embodiment can switch RZ modulation format (e.g., duty ratio is 50%) and non-modulation format in accordance with the modulation switching information. As an example, a description will be given of the optical modulation device 100 that can switch RZ-DQPSK and DQPSK.

Referring to FIG. 7, the optical modulation device 100 according to the second embodiment comprises: a MZ modulator 700; a driving unit 740A; a driving unit 740B; a branch unit 750; a light receiving unit 760; and a bias supply unit 770, in addition to the structure of the optical modulation device 100 according to the first embodiment. The MZ modulator 700 is a DQPSK modulator that performs differential quadrature phase shift keying. Although the driving unit performs differential operation of one driver, the modulator may be driven by two drivers.

The light source 110 generates continuous light, and outputs the generated light to the MZ modulator 700. The MZ modulator 700 comprises: a branch unit 710; an I arm 720A (second MZ modulator); a Q arm 720B (third MZ modulator); and a coupling unit 730. The branch unit 710 branches the continuous light output from the light source 110, and outputs one branched piece of the continuous light to the I arm 720A and further outputs the other piece of continuous light to the Q arm 720B.

The I arm 720A performs binary phase modulation of light passing through the I arm 720A in accordance with the drive signal output from the driving unit 740A. The I arm 720A comprises: a branch unit 721A; an optical waveguide 722A$a$; an optical waveguide 722A$b$; and a coupling unit 723A. The branch unit 721A branches the continuous light output from the branch unit 710, and outputs one branched piece of the continuous light to the optical waveguide 722A$a$ and further outputs the other piece of the continuous light to the optical waveguide 722A$b$.

The optical waveguide 722A$a$ comprises a phase modulating section 724A$a$. The phase modulating section 724A$a$ performs phase modulation of light passing through the optical waveguide 722A$a$ in accordance with the drive signal output from the driving unit 740A. The optical waveguide 722A$b$ comprises: a phase modulating section 724A$b$; and a phase modulating section 725A. The phase modulating section 724A$b$ performs phase modulation of light passing through the optical waveguide 722A$b$ in accordance with the drive signal output from the driving unit 740A.

The phase modulating section 725A performs phase modulation of light passing through the optical waveguide 722A$b$ in accordance with the bias voltage supplied from the bias supply unit 770. The coupling unit 723A couples the light passing through the optical waveguide 722A$a$ and the light passing through the optical waveguide 722A$b$, and outputs the coupled light to the coupling unit 730. The signal light output from the coupling unit 723A through the I arm 720A becomes a binary (0, π) differential phase modulation signal.

The Q arm 720B performs binary phase modulation of the light passing through the Q arm 720B in accordance with the drive signal output from the driving unit 740B. The Q arm 720B comprises: a branch unit 721B; an optical waveguide 722B$a$; an optical waveguide 722B$b$; a coupling unit 723B; and a π/2 delay unit 726. The branch unit 721B branches the continuous light output from the branch unit 710, and output one branched piece of the continuous light to the optical waveguide 722B$a$ and further outputs the other branched piece of the continuous light to the optical waveguide 722B$b$.

The optical waveguide 722B$a$ comprises a phase modulating section 724B$a$. The phase modulating section 724B$a$ performs phase modulation of the light passing through the optical waveguide 722B$a$ in accordance with the drive signal output from the driving unit 740B.

The optical waveguide 722B$b$ comprises: a phase modulating section 724B$b$; and a phase modulating section 725B. The phase modulating section 724B$b$ performs phase modulation of the light passing through the optical waveguide 722B$b$ in accordance with the drive signal output from the driving unit 740B.

The phase modulating section 725B performs phase modulation of the light passing through the optical waveguide 722B$b$ in accordance with the bias voltage supplied from the bias supply unit 770. The coupling unit 723B couples (interferes) the light passing through the optical waveguide 722B$a$ and the light passing through the optical waveguide 722B$b$, and outputs the coupled light to the π/2 delay unit 726. The π/2 delay unit 726 delays, by π/2, the light output from the coupling unit 723B on the basis of the bias voltage supplied from the bias supply unit 770, and outputs the delayed signal to the coupling unit 730.

The signal light output from the π/2 delay unit 726, passing through the Q arm 720B, becomes a binary (π/2, 3π/2) differential phase modulation signal, with the phase shifted by π/2 from the phase of the signal light passing through the I arm 720A. The coupling unit 730 couples (interferes) the light passing through the I arm 720A and the light passing through the Q arm 720B, and outputs the coupled light to the branch unit 750. The signal light output from the coupling unit 730 becomes quadrature (0, π/2, π, 3/2π) signal light subjected to the DQPSK.

The driving unit 740A inputs a data signal (DATA_A), and outputs the input data signal as the drive signal to the I arm 720A in the MZ modulator 700. Further, the driving unit 740A controls, to 2Vπ, the voltage of the drive signal to be output to the I arm 720A. For example, the driving unit 740A performs push-pull modulation for always outputting the drive signals (voltage Vπ) of inverse signs, of the phase modulating section 724A$a$ and the phase modulating section 724A$b$ in the I arm 720A.

The driving unit 740B inputs a data signal (DATA_B), and outputs the input data signal as the drive signal to the Q arm 720B in the MZ modulator 700. Further, the driving unit 740B controls, to 2Vπ, the voltage of the drive signal to be output to the Q arm 720B. For example, the driving unit 740B performs push-pull modulation for always outputting the drive signals (voltage Vπ) of inverse signs, of the phase modulating section 724B$a$ and the phase modulating section 724B$b$ in the Q arm 720B.

The branch unit 750 branches the signal light subjected to the DQPSK output from the MZ modulator 700, and outputs one branched piece of the signal light subjected to the DQPSK to the MZ modulator 120 and further outputs the other branched piece of the signal light subjected to the DQPSK to the light receiving unit 760. The light receiving unit 760 converts the DQPSK signal output from the branch unit 750 into the electrical signal.

The bias supply unit 770 supplies the bias voltage to the MZ modulator 700. Although not shown, the MZ modulator 700 may superimpose the low-frequency signal to the drive signal and may perform synchronous detection of the DQPSK signal output from the MZ modulator 700.

In this case, with the same structure as that of the bias control unit 160 as mentioned above, the bias supply unit 770 supplies, to the phase modulating section 725A, the phase modulating section 725B, and the π/2 delay unit 726 in the MZ modulator 700, the bias voltage corresponding to the component of the frequency f0 included in the electrical signal converted by the light receiving unit 760.

The MZ modulator 120 performs RZ modulation of the signal light subjected to the DQPSK output from the branch unit 750. Further, the MZ modulator 120 switches the RZ modulation/non-modulation in accordance with the modulation switching information. The driving unit 130 inputs a clock signal (CLOCK), and outputs the input clock signal as the drive signal to the MZ modulator 120.

Further, the driving unit 130 controls, to Vπ or OFF, the voltage of the drive signal to be output to the MZ modulator 120 under the control of the modulation switching unit 180. For example, the driving unit 130 performs push-pull modulation for outputting clock signals (with a voltage Vπ/2) with inverse phases, of non-inverse clock signals to the phase modulating section 123a and the phase modulating section 123b in the MZ modulator 120.

Upon obtaining the modulation switching information indicating the switching from the DQPSK to the RZ-DQPSK, the modulation switching unit 180 controls, to Vπ, the voltage of the drive signal to be output from the driving unit 130 to the MZ modulator 120, and switches the switch 170 to the first path 171. As a consequence, the MZ modulator 120 is operated as an RZ modulator. Therefore, the signal light output from the MZ modulator 120 becomes the signal light subjected to the RZ-DQPSK.

Further, upon obtaining the modulation switching information indicating the switching from the RZ-DQPSK to the DQPSK, the modulation switching unit 180 controls, to OFF, the voltage of the drive signal to be output from the driving unit 130 to the MZ modulator 120, and switches the switch 170 to the second path 172. As a consequence, the function of the MZ modulator 120 is reset as the RZ modulator. Therefore, the signal light output from the MZ modulator 120 becomes the signal light subjected to the DQPSK.

Furthermore, upon obtaining the modulation switching information indicating the switching from the DQPSK to the RZ-DQPSK, the modulation switching unit 180 outputs the control information on the switching to the RZ-DQPSK to the bias-point holding unit 190. In addition, obtaining the modulation switching information indicating the switching from the RZ-DQPSK to the DQPSK, the modulation switching unit 180 outputs the control information on the switching to the DQPSK to the bias-point holding unit 190.

Figure 8:
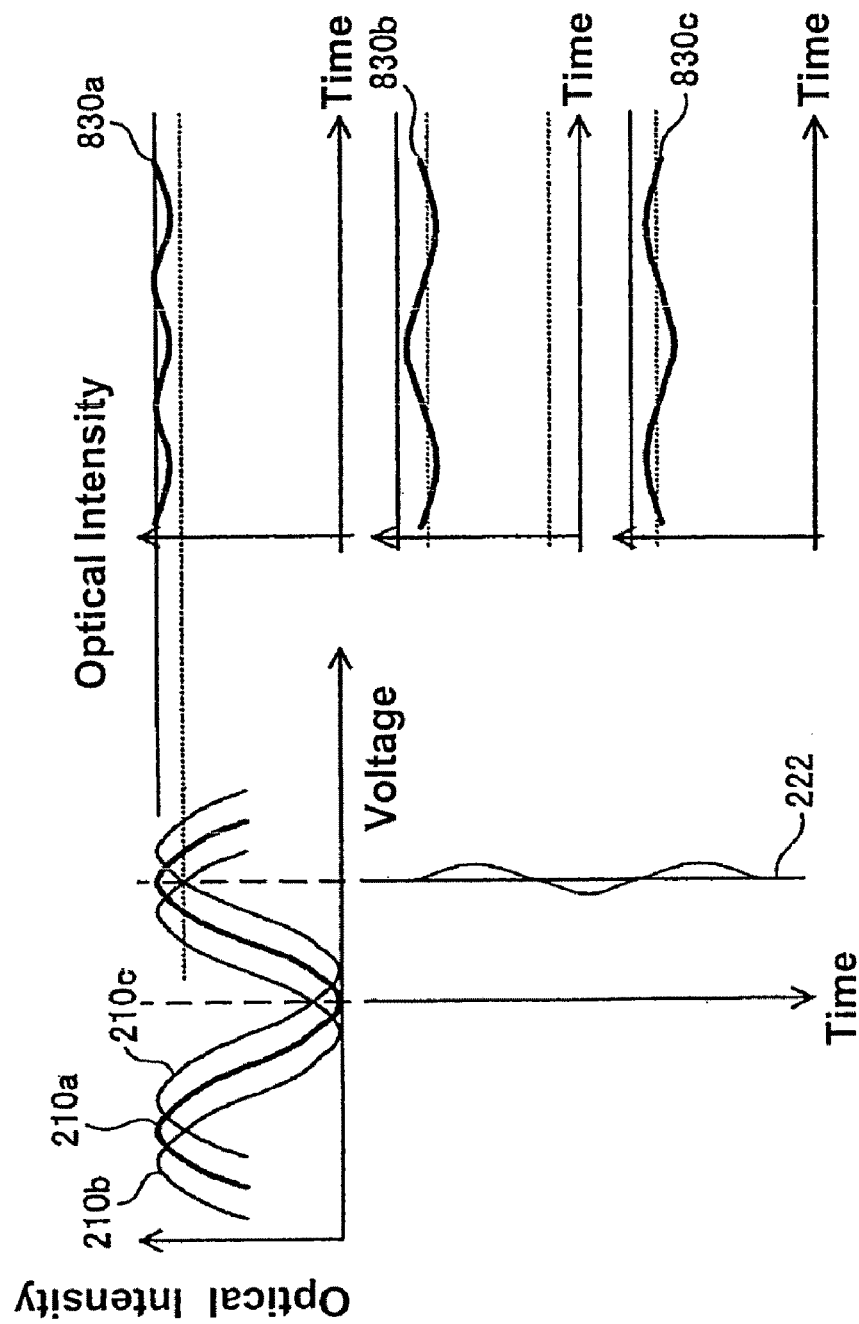
FIG. 8 is a diagram showing input/output characteristics (of DQPSK) of a MZ modulator.

FIG. 8 is a diagram showing input/output characteristics (of DQPSK format) of the MZ modulator. Referring to FIG. 8, the same components as those shown in FIG. 2 are designated by the same reference numerals, and a description thereof is omitted. In the DQPSK, the modulation switching unit 180 controls the voltage of the drive signal to OFF, switches the switch 170 to the second path 172, and superimposes the low-frequency signal of the frequency f0 to the bias voltage.

Further, in the DQPSK, the bias point 222 is set to a voltage as a peak (light emission state) of the input/output characteristics 210. Since the bias point 222 is set to the voltage as the peak of the input/output characteristics 210 and the voltage of the drive signal is OFF, the intensity of the signal light is always "1" (light emission state).

Therefore, the signal light subjected to the DQPSK output to the MZ modulator 120 is not modulated by the MZ modulator 120, and is still output as the signal light subjected to the DQPSK. Further, since the low-frequency signal of the frequency f0 is superimposed to the bias voltage, the voltage applied to the MZ modulator 120 is always changed by the frequency f0, similarly to the case in which the driving unit 130 superimposes the low-frequency signal of the frequency f0 to the drive signal.

In the DQPSK, reference numeral 830 (830a to 830c) denotes signal light output from the MZ modulator 120. The signal light 830a, 830b, and 830c denotes signal light when the input/output characteristics 210 of the MZ modulator 120 are individually the input/output characteristics 210a, 210b, and 210c.

Similarly to the DPSK (refer to reference numeral 230 in FIG. 2), when the input/output characteristics 210 are the input/output characteristics 210a, the signal light 830a does not include the component of the frequency f0. When the input/output characteristics 210 are the input/output characteristics 210b, the signal light 830b includes the component of the frequency f0. When the input/output characteristics 210 are the input/output characteristics 210c, the signal light 830c includes the component of the frequency f0.

The input/output characteristics (of RZ-DQPSK format) of the MZ modulator 120 are the same as the input/output characteristics (of NRZ intensity modulation format) of the MZ modulator 120 shown in FIG. 3 and therefore are not shown. In the RZ-DQPSK, the driving unit 130 outputs the clock signal as the drive signal to the MZ modulator 120. Hence, the signal light subjected to the DQPSK output to the MZ modulator 120 is RZ-modulated in accordance with the clock signal and is output as signal light subjected to the RZ-DQPSK.

Figure 9:
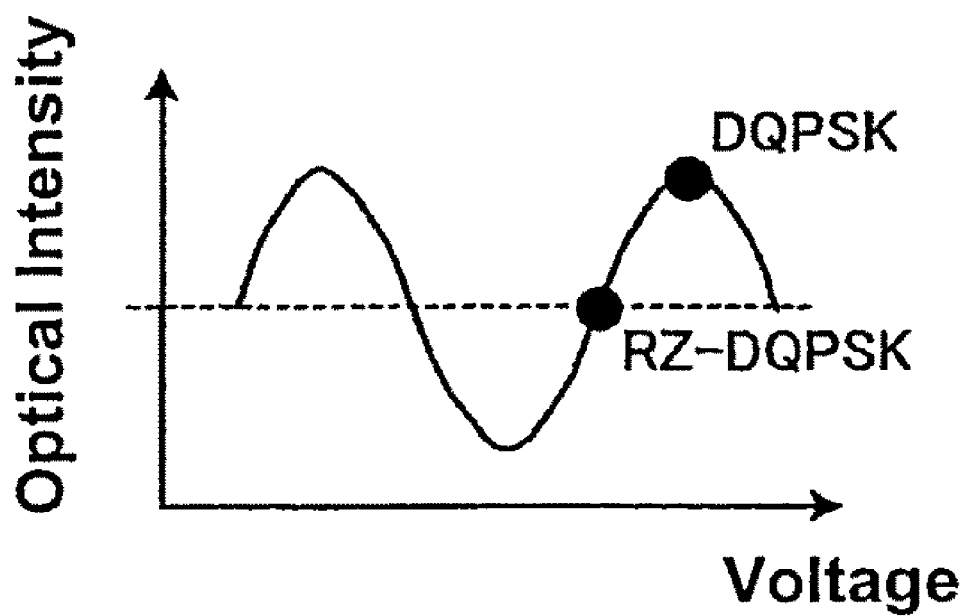
FIG. 9 is a diagram showing bias points of the MZ modulator (in RZ-DQPSK and DQPSK).

FIG. 9 is a diagram showing bias points of the MZ modulator (in RZ-DQPSK format and DQPSK format). Referring to FIG. 9, in the DQPSK, the bias point 222 of the MZ modulator 120 is set to a voltage as a peak of the input/output characteristics 210 (light emission state). In the RZ-DQPSK, the bias point 222 is at the center between the valley (quenching state) and the peak (light emission state) of the input/output characteristics 210, and is set to a voltage so that the differential value of the input/output characteristics 210 is positive.

The bias-point holding unit 190 may hold information on voltage values of the bias point 222 for every modulation. When the bias supply unit 162 switches the RZ-DQPSK to the DPSK on the basis of the information, the bias voltage is increased by Vπ/4 and the bias voltage is thereafter controlled on the basis of the component of the frequency f0 output from the phase comparator 161.

Although the RZ-DQPSK and the DQPSK can be switched as a structure for switching the RZ modulation and non-modulation by the optical modulation device 100, the structure for switching the RZ modulation and the non-modulation is not limited to this. In place of the MZ modulator 700, when an NRZ intensity modulator is provided, the optical modulation device 100 can switch the RZ intensity modulation and the NRZ intensity modulation.

Further, in place of the MZ modulator 700, when a phase modulator for binary phase modulation is provided, the optical modulation device 100 can switch the RZ-DPSK and the DPSK. In addition, in place of the MZ modulator 700, various modulators can be provided.

Furthermore, the MZ modulator 700 is arranged at the before-stage of the MZ modulator 120. However, the MZ modulator 700 may be arranged at the after-stage of the MZ modulator 120. In this case, the MZ modulator 120 RZ-modulates the continuous light output from the light source 110. Moreover, the MZ modulator 700 performs the RZ-DQPSK of RZ pulses obtained by RZ-modulation with the MZ modulator 120.

As mentioned above, with the optical modulation device 100 according to the second embodiment, the drive signal and the path of the switch for the MZ modulator 120 are switched, thereby switching the RZ modulation and the non-modulation. Therefore, even if changing the transmission condition of the optical communication system, the modulation can be switched to modulation in which transmission characteristics do not deteriorate against the changed transmission condition.

In addition, with the optical modulation device 100 according to the second embodiment, similarly to the optical modulation device 100 according to the first embodiment, the size of the apparatus is reduced, the apparatus is simplified, and costs are reduced. Moreover, it is possible to flexibly cope with the optical communication system in which the transmission condition frequently changes and also to reduce the time from changing the modulation to stabilizing the transmission characteristics of the signal light.

Third Embodiment

Figure 10A:
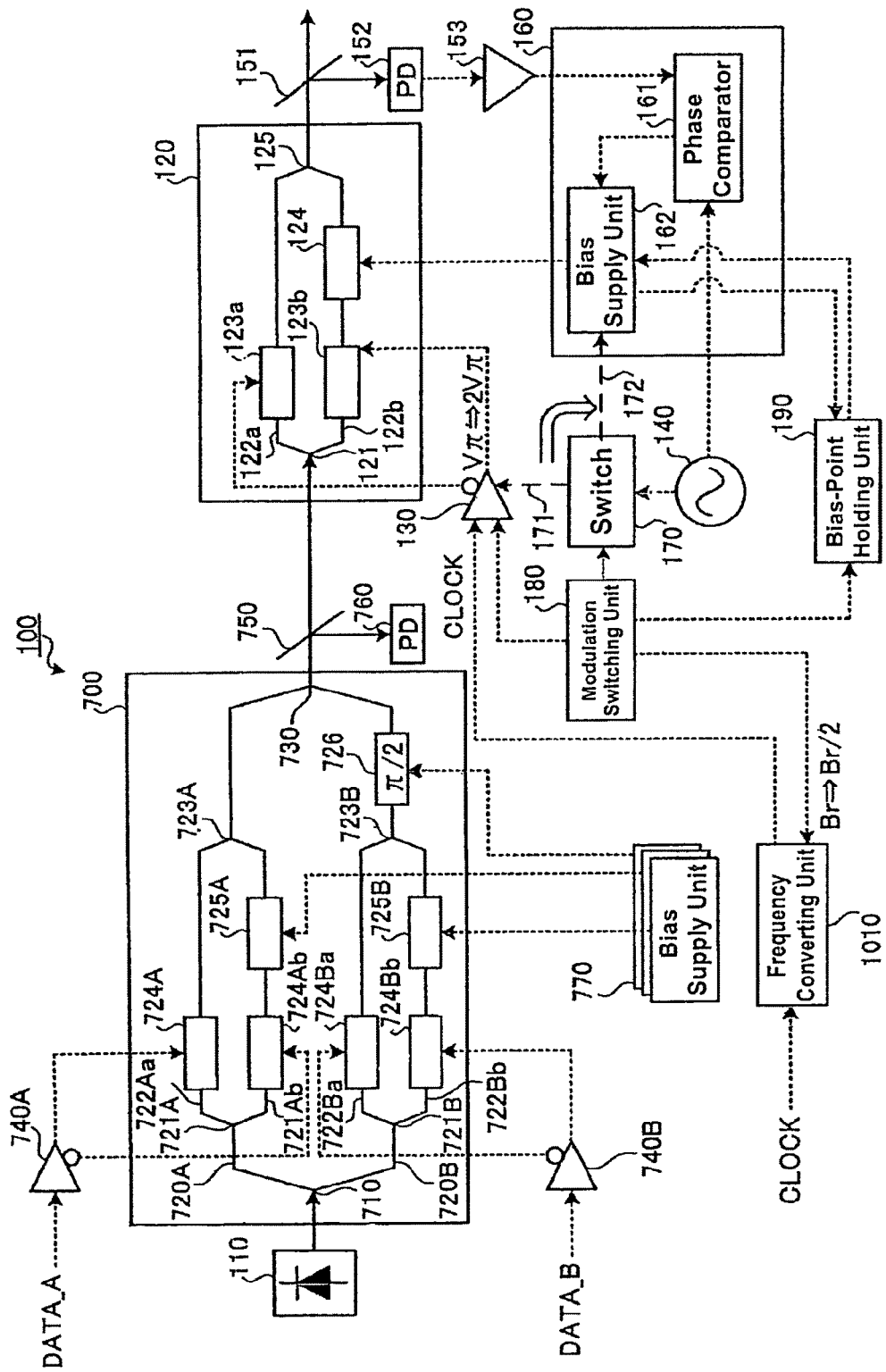
FIG. 10A is a block diagram showing the structure of an optical modulator according to the third embodiment.

FIG. 10A is a block diagram showing the structure of a optical modulator according to the third embodiment. Referring to FIG. 10A, the same components as those shown in FIG. 7 are designated by the same reference numerals and a description thereof is omitted. An optical modulation device 100 according to the third embodiment can switch the RZ modulation format and CSRZ modulation format in accordance with the modulation switching information. As an example, a description will be given of the structure in which the optical modulation device 100 can switch the RZ-DQPSK and the CSRZ-DQPSK.

The MZ modulator 120 performs the RZ modulation or the CSRZ modulation of the signal light subjected to the DQPSK output from the branch unit 750. Further, the MZ modulator 120 switches the RZ modulation/CSRZ modulation in accordance with the modulation switching information. Referring to FIG. 10A, the optical modulation device 100 according to the third embodiment comprises a frequency converting unit 1010 in addition to the optical modulation device 100 according to the second embodiment.

The frequency converting unit 1010 inputs the clock signal (CLOCK), converts a frequency of the input clock signal into a frequency Br/2 as half of a frequency Br corresponding to the RZ modulation. The frequency converting unit 1010 switches the frequency of the clock signal to the frequency Br or Br/2 under the control of the modulation switching unit 180. The frequency converting unit 1010 outputs, to the driving unit 130, the clock signal whose frequency is converted.

The driving unit 130 outputs, to the MZ modulator 120, the clock signal output from the frequency converting unit 1010 as the drive signal. Further, the driving unit 130 controls, to Vπ or 2Vπ, the voltage of the drive signal output to the MZ modulator 120 under the control of the modulation switching unit 180.

Upon obtaining the modulation switching information indicating the switching from the CSRZ-DQPSK to the RZ-DQPSK, the modulation switching unit 180 controls, to Vπ, the voltage of the drive signal output from the driving unit 130 to the MZ modulator 120, switches the switch 170 to the first path 171, and further switches the frequency of the clock signal to Br. As a consequence, the MZ modulator 120 is operated as an RZ modulator. Therefore, the signal light output from the MZ modulator 120 becomes the signal light subjected to the RZ-DQPSK.

Further, upon obtaining the modulation switching information indicating the switching from the RZ-DQPSK to the CSRZ-DQPSK, the modulation switching unit 180 controls, to 2Vπ, the voltage of the drive signal output from the driving unit 130 to the MZ modulator 120, switches the switch 170 to the second path 172, and further switches the frequency of the clock signal to Br/2. As a consequence, the MZ modulator 120 is operated as a CSRZ modulator. Therefore, the signal light output from the MZ modulator 120 becomes the signal light subjected to the CSRZ-DQPSK.

Furthermore, upon obtaining the modulation switching information indicating the switching from the CSRZ-DQPSK to the RZ-DQPSK, the modulation switching unit 180 outputs control information on the switching to the RZ-DQPSK to the bias-point holding unit 190. In addition, upon obtaining the modulation switching information indicating the switching from the RZ-DQPSK to the CSRZ-DQPSK, the modulation switching unit 180 outputs control information on the switching to the CSRZ-DQPSK to the bias-point holding unit 190.

Figure 10B:
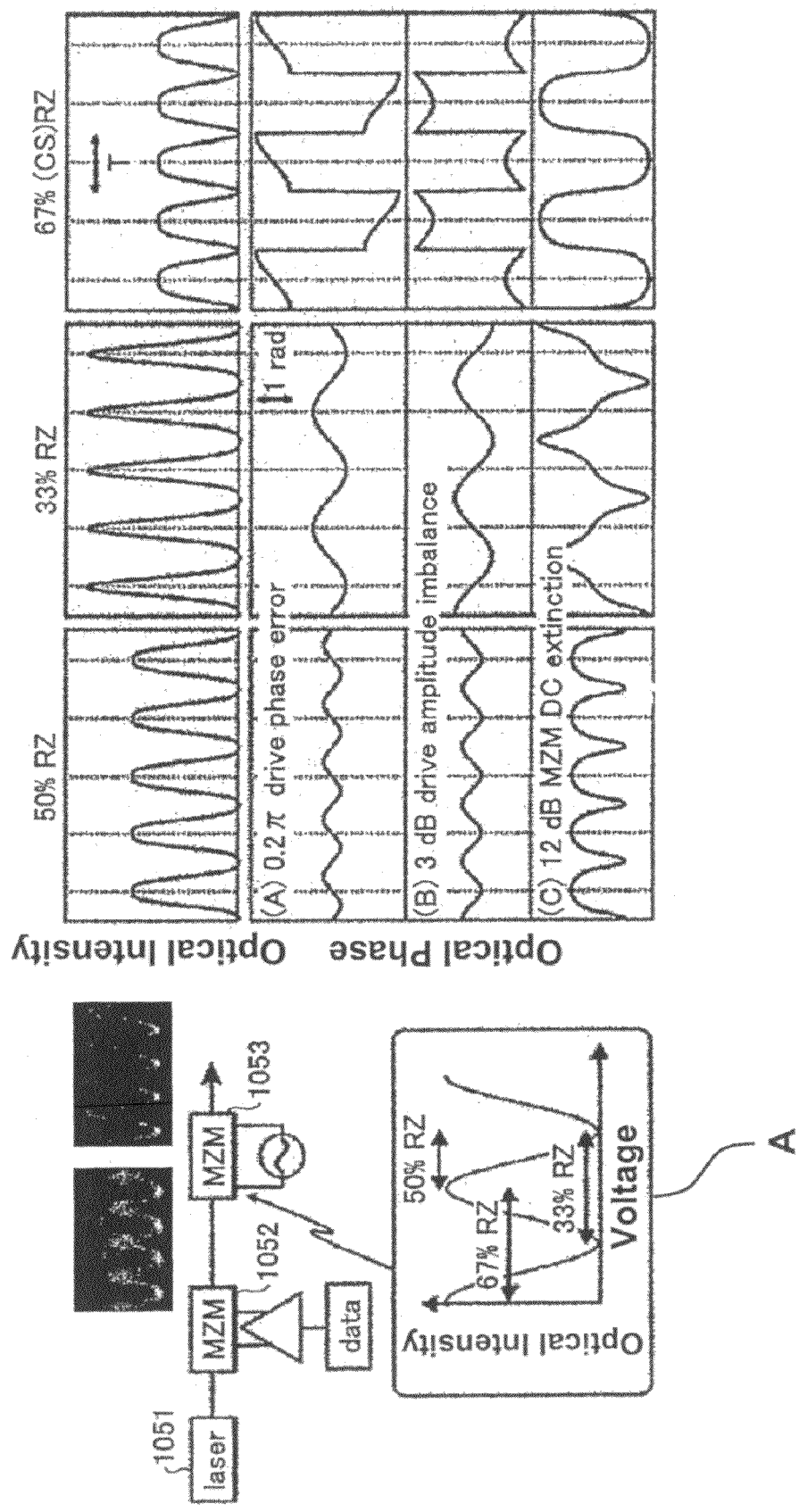
FIG. 10B is a diagram showing various RZ modulations with the MZ modulator.

FIG. 10B is a diagram showing various RZ modulations with the MZ modulator. In FIG. 10A, the optical modulation device 100 can switch 50%-RZ modulation (duty ratio 50%) and the CSRZ modulation. However, the optical modulation device 100 can switch 33%-RZ modulation.

Referring to FIG. 10B, a light source 1051 (Laser) corresponds to the above-mentioned light source 110. A MZ modulator 1052 (MZM) corresponds to the above-mentioned MZ modulator 700. A MZ modulator 1053 (MZM) corresponds to the above-mentioned MZ modulator 120 (specifically, refer to JOURNAL OF LIGHTWAVE TECHNOLOGY, VOL. 23, NO. 1, JANUARY 2005).

The 33%-RZ modulation is an RZ modulation having the duty ratio of approximately 33%. Further, the CSRZ modulation is an RZ modulation having the duty ratio of approximately 67%. Referring to A of FIG. 10B, the signal light subjected to the RZ modulation has intensities differing depending on the duty ratios. For example, the signal light subjected to the CSRZ modulation has low strength and the signal light subjected to the 33%-RZ modulation has high strength.

As mentioned above, upon obtaining the modulation switching information indicating the switching to 50%-RZ modulation, the modulation switching unit 180 controls, to Vπ, a voltage of the drive signal output from the driving unit 130 to the MZ modulator 120, switches the switch 170 to the first path 171, and further switches the frequency of the clock signal to Br.

On the other hand, upon obtaining the modulation switching information indicating the switching to 33%-RZ modulation, the modulation switching unit 180 controls, to Vπ, the voltage of the drive signal output from the driving unit 130 to the MZ modulator 120, switches the switch 170 to the second path 172, and further switches the frequency of the clock signal to Br.

Figure 11:
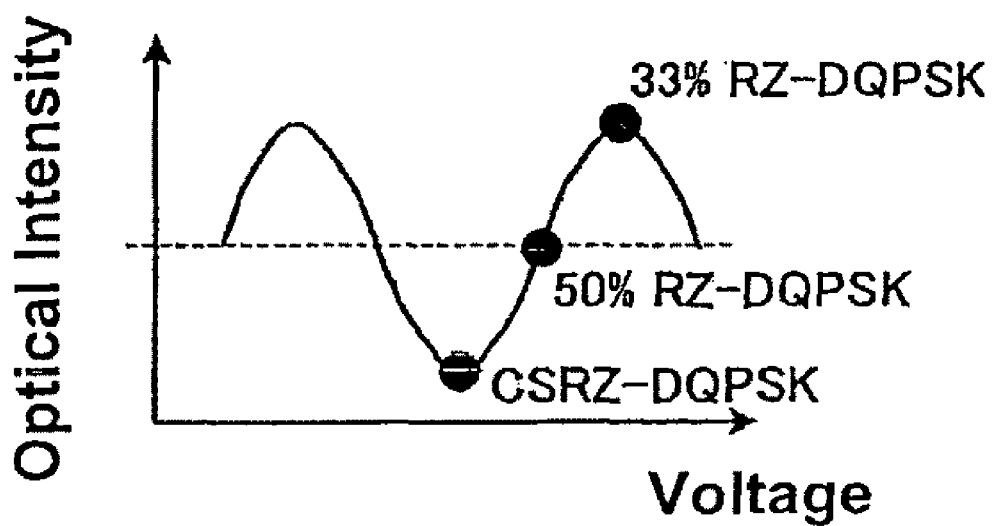
FIG. 11 is a diagram showing bias points of the MZ modulator (in RZ-DQPSK and CZ-DQPSK).

FIG. 11 is a diagram showing bias points of the MZ modulator (in RZ-DQPSK format and CZ-DQPSK format). Referring to FIG. 11, in 50% RZ-DQPSK, the bias point 222 of the MZ modulator 120 is at the center of the valley (quenching state) and the peak (light emission state) of the input/output characteristics 210, and is set to a voltage so that the differential value of the input/output characteristics 210 is positive. In the CSRZ-DQPSK, the bias point 222 is set to a voltage having the valley (quenching state) of the input/output characteristics 210. In the 33% RZ-DQPSK, the bias point 222 is set to a voltage having the peak (light emission state) of the input/output characteristics 210.

Although the optical modulation device 100 can switch the RZ-DQPSK and the CSRZ-DQPSK as the structure for switching the RZ modulation and the CSRZ modulation, the example of the structure for switching the RZ modulation and the CSRZ modulation is not limited to this. For example, in place of the MZ modulator 700, when an NRZ intensity modulator is provided, the optical modulation device 100 can switch the RZ intensity modulation and the CSRZ intensity modulation.

Further, in place of the MZ modulator 700, when a phase modulator for the binary phase modulation is provided, the optical modulation device 100 can switch the RZ-DPSK and the DSRZ-DPSK. In addition, in place of the MZ modulator 700, various modulators can be provided.

As mentioned above, in the optical modulation device 100 according to the third embodiment, the drive signal and the path of the switch of the MZ modulator 120 are switched, thereby switching the RZ modulation and the CSRZ modulation. Therefore, even if changing the transmission condition of the optical communication system, the modulation can be changed to a modulation in which the transmission characteristics do not deteriorate against the changed transmission condition.

Further, with the optical modulation device 100 according to the third embodiment, similarly to the optical modulation device 100 according to the first embodiment, the size of the apparatus is reduced, the apparatus is simplified, and costs are reduced. Moreover, it is possible to flexibly cope with the optical communication system in which the transmission condition frequently changes and also to reduce the time from changing the modulation to stabilizing the transmission characteristics of the signal light.

Fourth Embodiment

Figure 12:
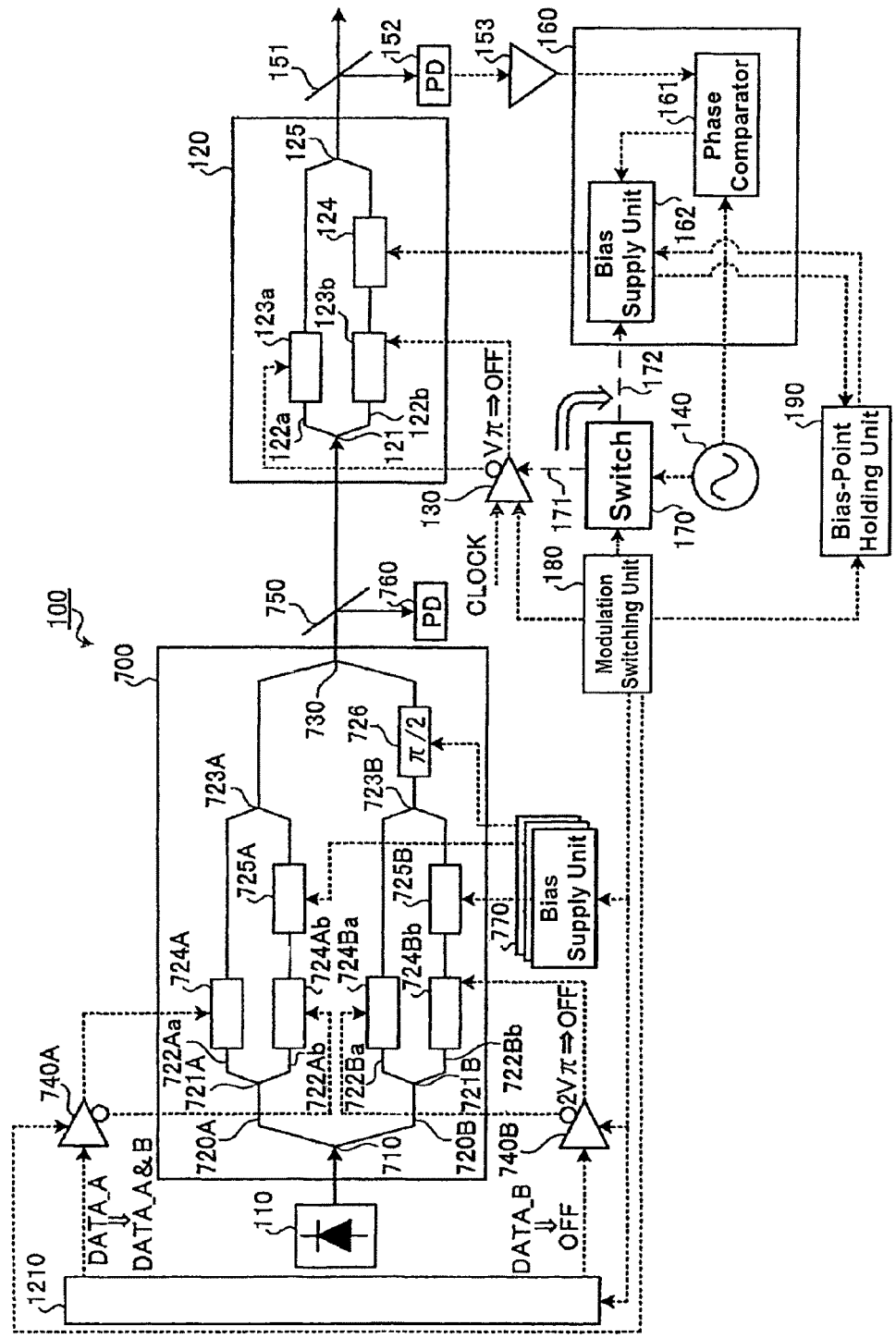
FIG. 12 is a block diagram showing the structure of an optical modulator according to the fourth embodiment.

FIG. 12 is a block diagram showing the structure of an optical modulator according to the fourth embodiment. Referring to FIG. 12, the same components as those shown in FIG. 7 are designated by the same reference numerals and a description thereof is omitted. An optical modulation device 100 according to the fourth embodiment can switch the DQPSK format and the DPSK format in accordance with the modulation switching information. As an example, a description will be given of an operation for switching the RZ-DQPSK and the DPSK by the optical modulation device 100.

Referring to FIG. 12, the optical modulation device 100 according to the fourth embodiment comprises a data processing unit 1210 (data generating means) in addition to the structure of the optical modulation device 100 according to the second embodiment. The MZ modulator 700 performs the DQPSK or the DPSK of the continuous light output from the light source 110. Further, the MZ modulator 120 switches the DQPSK/DPSK in accordance with the modulation switching information.

The data processing unit 1210 generates quadrature differential sign data (DATA_A and DATA_B) on the basis of the transmission data under the control of the modulation switching unit 180. In this case, the data processing unit 1210 outputs the DATA_A to the driving unit 740A, and further outputs the DATA_B to the driving unit 740B.

Further, the data processing unit 1210 generates binary differential sign data (DATA_A&B) on the basis of the transmission data under the control of the modulation switching unit 180. In this case, the data processing unit 1210 outputs the DATA_A&B to the driving unit 740A and does not output the data to the driving unit 740B (OFF).

The driving unit 740A outputs, to the MZ modulator 700, the DATA_A or DATA_A&B output from the data processing unit 1210, as the drive signal. The driving unit 740B outputs, to the MZ modulator 700, the DATA_B output from the data processing unit 1210, as the drive signal. The driving unit 740B further controls, to 2Vπ or OFF, the voltage of the drive signal to be output to the MZ modulator 700 under the control of the modulation switching unit 180.

Upon obtaining the modulation switching information indicating the switching from the DPSK to the RZ-DQPSK, the modulation switching unit 180 controls such an operation that the data processing unit 1210 generates the quadrature differential sign data (DATA_A and DATA_B), and further controls, to 2Vπ, the voltage of the drive signal to be output from the driving unit 740B to the MZ modulator 700. As a consequence, the MZ modulator 700 is operated as a DQPSK modulator.

Further, the modulation switching unit 180 controls, to Vπ, the voltage of the drive signal to be output from the driving unit 130 to the MZ modulator 120 in this case, and switches the switch 170 to the first path 171. As a consequence, the MZ modulator 120 is operated as an RZ modulator. Therefore, the signal light output from the MZ modulator 120 becomes the signal light subjected to the RZ-DQPSK.

Further, upon obtaining the modulation switching information indicating the switching from the DQPSK to the DPSK, the modulation switching unit 180 controls an operation so that the data processing unit 1210 generates binary differential sign data (DATA_A&B), and further controls, to OFF, the voltage of the drive signal to be output from the driving unit 740B to the MZ modulator 700.

In this case, since the voltage of the drive signal output from the driving unit 740B is OFF, the MZ modulator 700 does not perform the binary phase modulation using the Q arm 720B, but performs the binary phase modulation using the I arm 720A. As a consequence, the MZ modulator 700 is operated as a DPSK modulator.

When the operation is performed so that the data processing unit 1210 generates the binary differential sign data (DATA_A&B), the data is not transmitted from the data processing unit 1210 to the driving unit 740B. Therefore, it is possible to omit the control operation for switching-OFF the voltage of the drive signal to be output from the driving unit 740B to the MZ modulator 700.

Further, the modulation switching unit 180 controls, to OFF, the voltage of the drive signal to be output from the driving unit 130 to the MZ modulator 120 in this case, and switches the switch 170 to the second path 172. As a consequence, the function of the MZ modulator 120 is reset as the RZ modulator. Therefore, the signal light output from the MZ modulator 120 becomes the signal light subjected to the DQPSK.

Upon obtaining the modulation switching information indicating the switching form DPSK to the RZ-DQPSK, the modulation switching unit 180 outputs control information on the switching to the RZ-DQPSK to the bias-point holding unit 190. Further, upon obtaining the modulation switching information on the switching from the RZ-DQPSK to the DPSK, the modulation switching unit 180 outputs control information on the switching to the DPSK to the bias-point holding unit 190.

Figure 13:
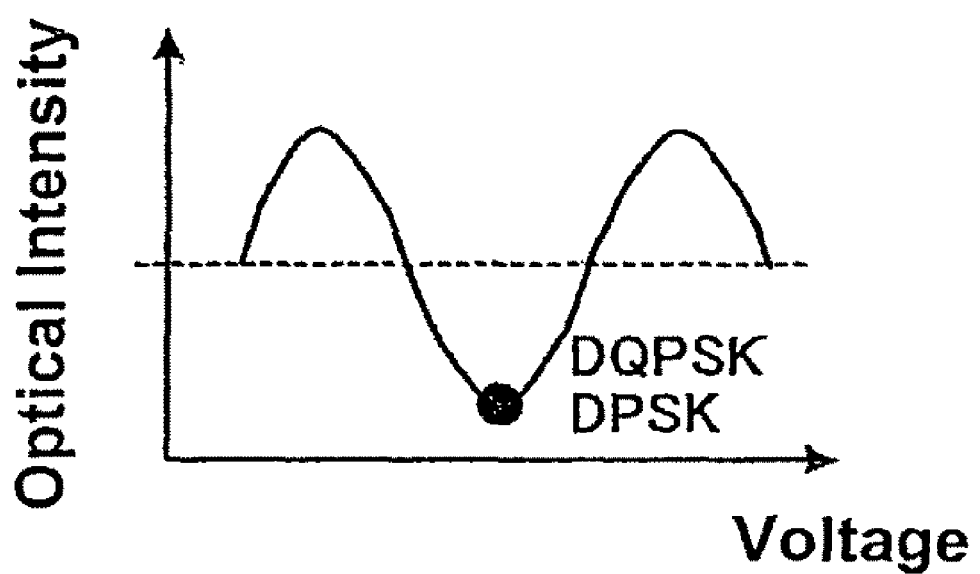
FIG. 13 is a diagram showing a bias point of a Q arm (in DQPSK and DPSK).

FIG. 13 is a diagram showing a bias point of the Q arm (in DQPSK format and DPSK format). Referring to FIG. 13, in both the DQPSK and the DPSK, the bias point 222 of the Q arm 720B in the MZ modulator 700 is set to a voltage having the valley (quenching state) of the input/output characteristics 210.

Although the optical modulation device 100 switches the RZ-DQPSK and the DPSK as the example in which the optical modulation device 100 switches the DQPSK and the DPSK, the present invention is not limited to this. For example, the optical modulation device 100 can switch the DQPSK and the RZ-DPSK.

Upon obtaining the modulation switching information indicating the switching from the RZ-DPSK to the DQPSK, the modulation switching unit 180 allows the MZ modulator 700 to be operated as a DQPSK modulator under the above-mentioned control, and the function of the MZ modulator 120 is reset as the RZ modulator. As a consequence, the signal light output from the MZ modulator 120 becomes the signal light subjected to the DQPSK.

Further, upon obtaining the modulation switching information indicating the switching from the DQPSK to the RZ-DPSK, the modulation switching unit 180 allows the MZ modulator 700 to be operated as a DPSK modulator under the above-mentioned control, and the function of the MZ modulator 120 is reset as the RZ modulation. As a consequence, the signal light output from the MZ modulator 120 becomes RZ-DPSK signal light.

Although the optical modulation device 100 switches the RZ-DQPSK and the DPSK as the example in which the optical modulation device 100 switches the DQPSK and the DPSK, the present invention is not limited to the switching of the DQPSK and the DPSK.

For example, in place of the MZ modulator 120, a multi-valued intensity modulator is provided and the optical modulation device 100 can then switch multivalued modulation such as an octonary QAM (Quadrature Amplitude Modulation) and sixteen-valued QAM. Further, the MZ modulator 120 is not provided, and the optical modulation device 100 can thus switch the DQPSK and the DPSK.

As mentioned above, the optical modulation device 100 according to the fourth embodiment switches the drive signal for the MZ modulator 700, thereby switching the DQPSK and the DPSK. Therefore, even if changing the transmission condition of the optical communication system, it is possible to switch the modulation to a modulation by which the transmission characteristics do not deteriorate against the changed transmission condition.

Further, with the optical modulation device 100 according to the fourth embodiment, similarly to the optical modulation device 100 according to the first embodiment, the size of the apparatus is decreased, the apparatus is simplified, and costs are reduced. Moreover, it is possible to flexibly cope with the optical communication system in which the transmission condition frequently changes and also to reduce the time from changing the modulation to stabilizing the transmission characteristics of the signal light.

Fifth Embodiment

Figure 14:
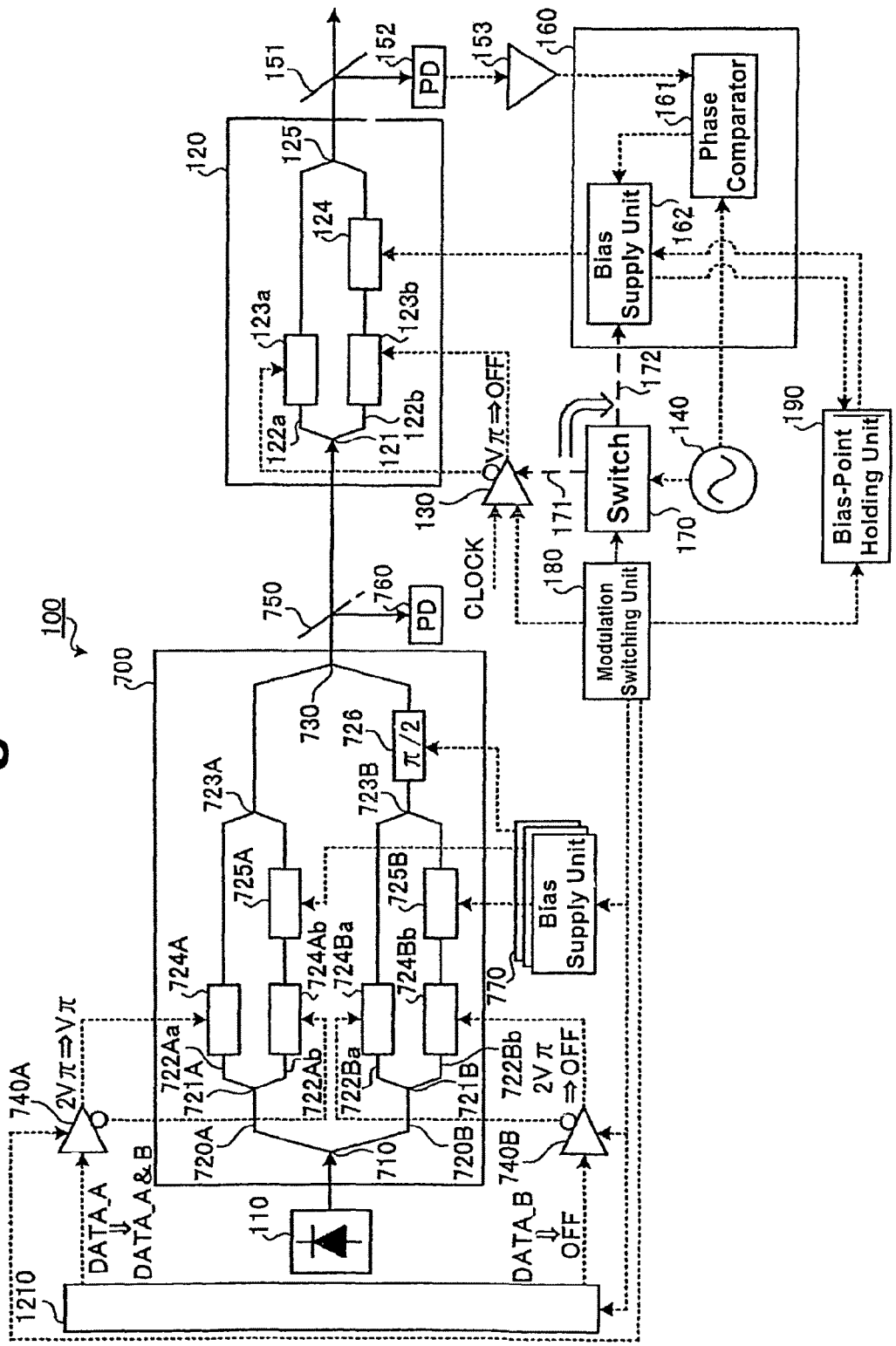
FIG. 14 is a block diagram showing the structure of an optical modulator according to the fifth embodiment.

FIG. 14 is a block diagram showing the structure of a optical modulator according to the fifth embodiment. Referring to FIG. 14, the same components as those shown in FIG. 12 are designated by the same reference numerals and a description thereof is omitted. A optical modulation device 100 according to the fifth embodiment can switch the DQPSK format and the NRZ intensity modulation format in accordance with the modulation switching information.

The MZ modulator 700 performs the DQPSK or the NRZ intensity modulation of the continuous light output from the light source 110. Further, the MZ modulator 700 switches the DQPSK/NRZ intensity modulation in accordance with the modulation switching information. The driving unit 740A controls, to 2Vπ or Vπ, the voltage of the drive signal to be output to the MZ modulator 700 under the control of the modulation switching unit 180.

Upon obtaining the modulation switching information indicating the switching from the DPSK to the DQPSK, the modulation switching unit 180 controls an operation that the data processing unit 1210 generates quadrature differential sign data (DATA_A and DATA_B), and further controls, to 2Vπ, the voltage of the drive signal to be output from the driving unit 740A and the driving unit 740B to the MZ modulator 700. As a consequence, the MZ modulator 700 is operated as a DQPSK modulator.

Upon obtaining the modulation switching information indicating the switching from the DQPSK to the NRZ intensity modulation, the modulation switching unit 180 controls an operation so that the data processing unit 1210 generates binary differential sign data (DATA_A&B), further controls, to 2Vπ, the voltage of the drive signal to be output from the driving unit 740A to the MZ modulator 700, and furthermore controls, to OFF, the voltage of the drive signal to be output from the driving unit 740B to the MZ modulator 700.

In this case, since the voltage of the drive signal to be output from the driving unit 740B is OFF, the Q arm 720B does not perform the binary phase modulation in the MZ modulator 700. Further, since the voltage of the drive signal to be output from the driving unit 740A is Vπ, the I arm 720A performs the binary NRZ intensity modulation. As a consequence, the MZ modulator 700 is operated as an NRZ intensity modulator.

The operation is controlled that the data processing unit 1210 generates the binary differential sign data (DATA_A&B) and then the data is not transmitted from the data processing unit 1210 to the driving unit 740B. Therefore, it is possible to omit the control operation for switching-OFF the voltage of the drive signal to be output from the driving unit 740B to the MZ modulator 700.

Further, upon obtaining the modulation switching information indicating the switching from the NRZ intensity modulation to the DQPSK, the modulation switching unit 180 outputs control information on the switching to the DQPSK to the bias-point holding unit 190. Furthermore, upon obtaining the modulation switching information indicating the switching from the DQPSK to the NRZ intensity modulation, the modulation switching unit 180 outputs control information on the switching to the NRZ intensity modulation to the bias-point holding unit 190.

Figure 15:
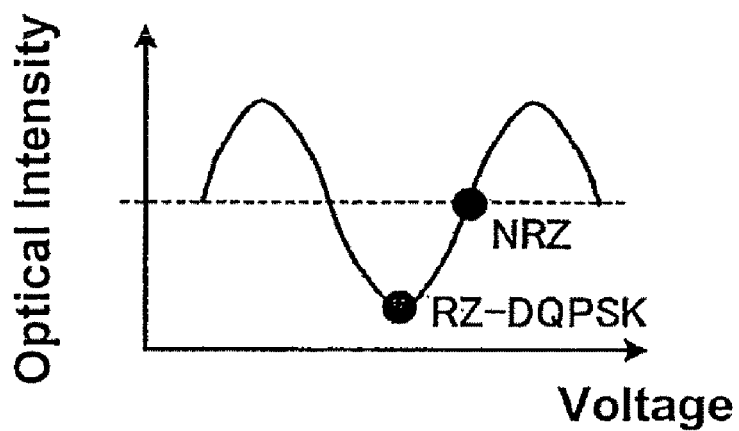
FIG. 15 is a diagram showing bias points of an I arm (in RZ-DQPSK and NRZ intensity modulation).

FIG. 15 is a diagram showing bias points of the I arm (in RZ-DQPSK format and NRZ intensity modulation format). Referring to FIG. 15, in the RZ-DQPSK, the bias point 222 of the I arm 720A is set to a voltage having the valley (quenching state) of the input/output characteristics 210 in the MZ modulator 700. In the NRZ intensity modulation, the bias point 222 of the I arm 720A is at the center between the valley (quenching state) and the peak (light emission state) of the input/output characteristics 210, and is set to a voltage for setting the differential value of the input/output characteristics 210 to the positive.

Figure 16:
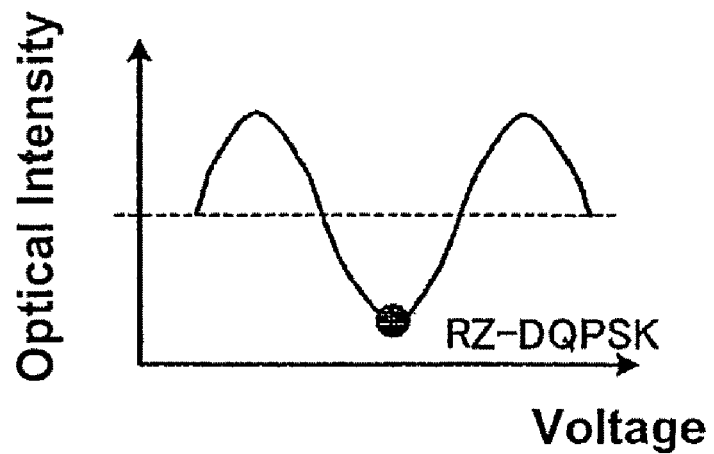
FIG. 16 is a diagram showing a bias point of a Q arm (in RZ-DQPSK and NRZ intensity modulation).

FIG. 16 is a diagram showing the bias point of the Q arm (in RZ-DQPSK format and NRZ intensity modulation format). Referring to FIG. 16, in both the RZ-DQPSK and the NRZ intensity modulation, the bias point 222 of the Q arm 720B in the MZ modulator 700 is set to a voltage having the valley (quenching state) of the input/output characteristics 210.

The description is given of the example in which the optical modulation device 100 switches the RZ-DQPSK and the NRZ intensity modulation as the example for switching the DQPSK and the NRZ intensity modulation. However, the operation for switching of the DQPSK and the DPSK is not limited to this. For example, the optical modulation device 100 can switch the DQPSK and the RZ intensity modulation.

Upon obtaining the modulation switching information indicating the switching from the RZ intensity modulation to the DQPSK, the modulation switching unit 180 operates the MZ modulator 700 as a DQPSK modulator under the above-mentioned control, and the function of the MZ modulator 120 is reset as the RZ modulator. As a consequence, the signal light output from the MZ modulator 120 becomes the signal light subjected to the DQPSK.

Further, upon obtaining the modulation switching information indicating the switching from the DQPSK to the RZ intensity modulation, the modulation switching unit 180 operates the MZ modulator 700 as an NRZ intensity modulator and the MZ modulator 120 as an RZ modulator under the above-mentioned control. As a consequence, the signal light output from the MZ modulator 120 becomes the signal light subjected to the RZ intensity modulation.

The description is given of the example in which the optical modulation device 100 can switch the RZ-DQPSK and the NRZ intensity modulation as the example for switching the DQPSK and the NRZ intensity modulation. The example for switching the DQPSK and the DPSK is not limited to this. For example, the MZ modulator 120 is not provided, thereby switching the DQPSK and the NRZ intensity modulation by the optical modulation device 100.

As mentioned above, the optical modulation device 100 according to the fifth embodiment controls the data generation of the data processing unit 1210 and the drive signal for the MZ modulator 700, thereby switching the DQPSK and the NRZ intensity modulation. Therefore, even if changing the transmission condition of the optical communication system, the modulation can be switched to a modulation in which transmission characteristics do not deteriorate against the changed transmission condition.

Further, with the optical modulation device 100 according to the fifth embodiment, similarly to the optical modulation device 100 according to the first embodiment, it is possible to decrease the size of the apparatus, simplify the apparatus, and reduce costs without providing a plurality of modulators corresponding to modulations in order to change the modulation. Furthermore, it is possible to flexibly cope with the optical communication system in which the transmission condition frequently changes and also to reduce the time from changing the modulation to stabilizing the transmission characteristics of the signal light.

Sixth Embodiment

FIG. 17A is a block diagram showing the structure of an optical modulator according to the sixth embodiment. Referring to FIG. 17A, the same components as those shown in FIGS. 12 and 14 are designated by the same reference numerals, and a description thereof is omitted. An optical modulation device 100 according to the sixth embodiment can switch the DQPSK format and the duobinary modulation format in accordance with the modulation switching information.

A description will be given of the structure in which the optical modulation device 100 can switch the RZ-DQPSK and the duobinary modulation as an example. The MZ modulator 700 performs the DQPSK or the duobinary modulation of the continuous light output from the light source 110. Further, the MZ modulator 700 switches the DQPSK/duobinary modulation in accordance with the modulation switching information.

Referring to FIG. 17A, the optical modulation device 100 according to the sixth embodiment comprises a delay unit 1710A and a delay unit 1710B in addition to the optical modulation device 100 according to the fourth embodiment. Further, the optical modulator according to the sixth embodiment comprises a delay unit 1720 (first-phase control means) in addition to the $\pi/2$ delay unit 726 in the optical modulation device 100 according to the fourth embodiment.

The data processing unit 1210 generates quadrature differential sign data (DATA_A and DATA_B) on the basis of transmission data under the control of the modulation switching unit 180. In this case, the data processing unit 1210 outputs the DATA_A to the delay unit 1710A and further outputs the DATA_B to the delay unit 1710B.

Further, the data processing unit 1210 generates binary differential sign data (DATA_A) on the basis of the transmission data under the control of the modulation switching unit 180. In this case, the data processing unit 1210 outputs the DATA_A to the delay unit 1710A and the delay unit 1710B. The delay unit 1710A and the delay unit 1710B (second-phase control means) control the phase difference between the DATA_A output from the delay unit 1710A and the DATA_A output from the delay unit 1710B under the control of the modulation switching unit 180.

Specifically, the delay unit 1710A delays the DATA_A output from the data processing unit 1210 under the control of the modulation switching unit 180, and outputs the delay data to the driving unit 740A. The delay unit 1710B delays the DATA_B or DATA_A output from the data processing unit 1210 under the control of the modulation switching unit 180, and outputs the delay data to the driving unit 740B.

Further, the delay unit 1710A and the delay unit 1710B control the amount of delay under the control of the modulation switching unit 180 so that the DATA_B output from the delay unit 1710B has the same phase as the phase of the DATA_A output from the delay unit 1710A or so that the DATA_B is delayed from the DATA_A by one bit.

The driving unit 740A outputs the DATA_A output from the delay unit 1710A, as the drive signal, to the MZ modulator 120. The driving unit 740B outputs the DATA_B or DATA_A output from the delay unit 1710B, as the drive signal, to the MZ modulator 120.

The delay unit 1720 controls the phase difference between the I arm 740A and the I arm 740B. Specifically, the delay unit 1720 delays, by $\pi/2$ or $n\pi$ (where n is integer), the phase of the light output from the coupling unit 723B under the control of the modulation switching unit 180, and outputs the delay phase to the coupling unit 730. The driving unit 130 controls, to $V\pi$ or OFF, the voltage of the drive signal to be output to the MZ modulator 120 under the control of the modulation switching unit 180.

Upon obtaining the modulation switching information indicating the switching from the duobinary modulation to the RZ-DQPSK, the modulation switching unit 180 controls an operation so that the data processing unit 1210 generates quadrature differential sign data (DATA_A and DATA_B), and further controls the amount of delay of the delay unit 1720 to $\pi/2$.

In this case, the modulation switching unit 180 controls the DATA_A to be output from the delay unit 1710B to have the same phase as the phase of the DATA_A to be output from the delay unit 1710A. As a consequence, the MZ modulator 700 is operated as a DQPSK modulator. Therefore, the signal light output from the MZ modulator 700 becomes the signal light subjected to the DQPSK.

In this case, the modulation switching unit 180 controls, to $V\pi$, the voltage of the drive signal output from the driving unit 130 to the MZ modulator 120, and switches the switch 170 to the first path 171. As a consequence, the MZ modulator 120 is operated as an RZ modulator. Therefore, the signal light output from the MZ modulator 120 becomes the signal light subjected to the RZ-DQPSK.

Upon obtaining the modulation switching information indicating the switching from the RZ-DQPSK to the duobinary modulation, the modulation switching unit 180 controls, to $n\pi$, the amount of delay of the delay unit 1720 so that the data processing unit 1210 generates binary differential sign data (DATA_A).

In this case, the modulation switching unit 180 controls such an operation that the DATA_A output from the delay unit 1710B is delayed from the DATA_A output from the delay unit 1710A by one bit. As a consequence, the MZ modulator 700 is operated as a duobinary modulator. Therefore, the signal light output from the MZ modulator 700 becomes duobinary signal light.

Further, the modulation switching unit 180 controls, to OFF, the voltage of the drive signal output from the driving unit 130 to the MZ modulator 120, and switches the switch 170 to the second path 172. As a consequence, the function of the MZ modulator 120 is reset as the RZ modulator. Therefore, the signal light output from the MZ modulator 120 becomes the duobinary signal light.

Upon obtaining the modulation switching information indicating the switching from the duobinary modulation to the RZ-DQPSK, the modulation switching unit 180 outputs control information on the switching to the RZ-DQPSK to the bias-point holding unit 190. Further, upon obtaining the modulation switching information indicating the switching from the RZ-DQPSK to the duobinary modulation, the modulation switching unit 180 outputs control information on the switching to the duobinary modulation to the bias-point holding unit 190.

Figure 17B:
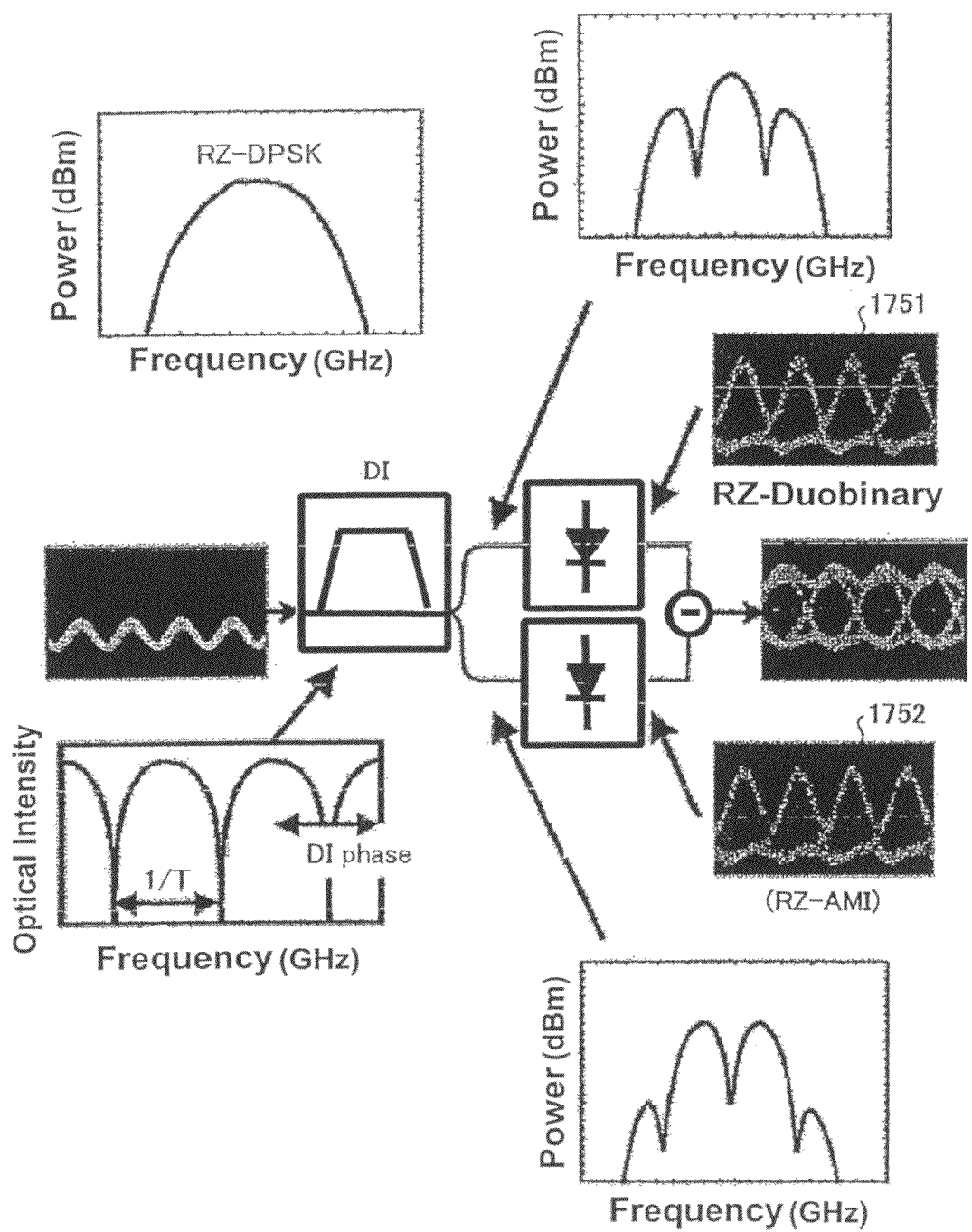
FIG. 17B is a diagram showing the switching of a duobinary modulation and an AMI modulation.

FIG. 17B is a diagram showing the switching of duobinary modulation and AMI modulation. The description is given of the structure in which the optical modulation device 100 can switch the DQPSK and the duobinary modulation with reference to FIG. 17A, the optical modulation device 100 can switch the DQPSK and AMI (Alternate Mark Inversion) modulation.

Referring to FIG. 17B, a waveform 1751 denotes a waveform of the signal light subjected to the RZ-duobinary modulation. A waveform 1752 denotes a waveform of signal light subjected to the RZ-AMI modulation (specifically, refer to JOURNAL OF LIGHTWAVE TECHNOLOGY, VOL. 23, NO. 1, JANUARY 2005).

Upon obtaining the modulation switching information indicating the switching to the duobinary modulation or AMI modulation, the modulation switching unit 180 controls an operation that the data processing unit 1210 generates binary differential sign data (DATA_A), further controls, to nπ, the amount of delay of the delay unit 1720, and furthermore controls an operation that the DATA_A output from the delay unit 1710B is delayed from the DATA_A output from the delay unit 1710A.

The coupling unit 730 in the MZ modulator 700 has another output path 1760 in addition to the output path connected to the MZ modulator 120, and outputs the signal light subjected to the duobinary modulation and the signal light subjected to the AMI modulation from the two output paths of coupling unit 730. The structure shown in FIG. 17A sets the output of the signal light subjected to the duobinary modulation from the path connected to the MZ modulator 120.

An Even/odd of n in the amount nπ of delay of the delay unit 1720 is switched, thereby switching the output path of the signal light subjected to the duobinary modulation and the AMI modulation. As a consequence, the optical modulation device 100 switches even/odd of n in the amount nπ of delay of the delay unit 1720, thereby switching the duobinary modulation and the AMI modulation. Therefore, the optical modulation device 100 sets even/odd of n so as to obtain the AMI modulation, thereby switching the DQPSK modulation and the AMI modulation.

Figure 18:
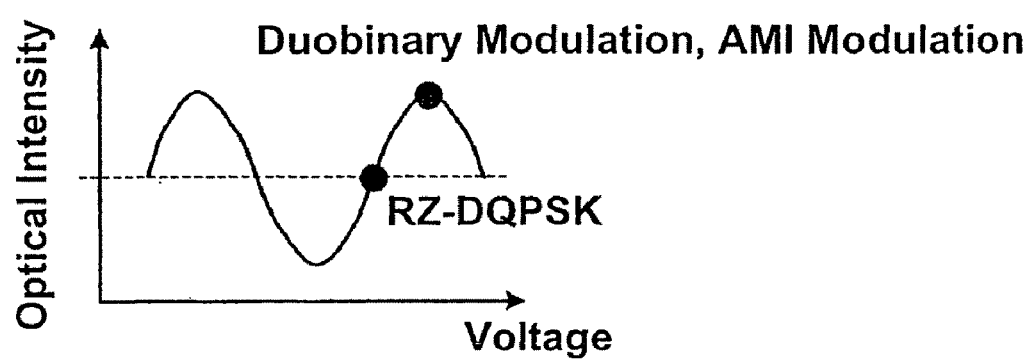
FIG. 18 is a diagram showing bias point of the MZ modulator (in RZ-DQPSK, duobinary modulation and AMI modulation).

FIG. 18 is a diagram showing the bias points of the MZ modulator (in RZ-DQPSK format, duobinary modulation format and AMI modulation format). Referring to FIG. 18, in the RZ-DQPSK modulation, the bias point 222 of the MZ modulator 120 is at the center between the valley (quenching state) and the peak (light emission state) of the input/output characteristics 210, and is set to a voltage having the differential value of the input/output characteristics 210 that is positive. In the duobinary modulation, the bias point 222 of the MZ modulator 120 is set to a voltage having the peak (light emission state) of the input/output characteristics 210.

As an example in which the optical modulation device 100 switches the DQPSK and the duobinary modulation, the description is given of the operation for switching the RZ-DQPSK and the duobinary modulation by the optical modulation device 100. However, the operation for switching the DQPSK and the duobinary modulation is not limited to this. For example, the optical modulation device 100 can switch the DQPSK and the RZ-duobinary modulation.

Upon obtaining the modulation switching information indicating the switching from the RZ intensity modulation to the DQPSK, the modulation switching unit 180 operates the MZ modulator 700 as a DQPSK modulator under the above-mentioned control, and the function of the MZ modulator 120 is reset as the RZ modulator. As a consequence, the signal light output from the MZ modulator 120 becomes the signal light subjected to the DQPSK.

Further, upon obtaining the modulation switching information indicating the switching from the DQPSK to the RZ intensity modulation, the modulation switching unit 180 operates the MZ modulator 700 as an NRZ intensity modulator under the above-mentioned control, and further operates the MZ modulator 120 as an RZ modulator. As a consequence, the signal light output from the MZ modulator 120 becomes the signal light subjected to the RZ intensity modulation.

As an example in which the optical modulation device 100 switches the DQPSK and the duobinary modulation, the description is given of the operation for switching the RZ-DQPSK and the duobinary modulation by the optical modulation device 100. However, the operation for switching the DQPSK and the duobinary modulation is not limited to this. For example, the MZ modulator 120 is not provided and the optical modulation device 100 can thus switch the DQPSK and the duobinary modulation.

The optical modulation device 100 according to the sixth embodiment controls the data generation of the data processing unit 1210, the amount of delay of the delay unit 1720, the phase difference of the data, the drive signal for the MZ modulator 700, thereby switching the DQPSK and the duobinary modulation. Therefore, even if changing the transmission condition of the optical communication system, it is possible to switch the modulation to a modulation by which the transmission characteristics do not deteriorate against the transmission condition.

In addition, with the optical modulation device 100 according to the sixth embodiment, similarly to the optical modulation device 100 according to the first embodiment, the size of the apparatus is reduced, the apparatus is simplified, and costs are reduced. Moreover, it is possible to flexibly cope with the optical communication system in which the transmission condition frequently changes and also to reduce the time from changing the modulation to stabilizing the transmission characteristics of the signal light.

Figure 19:
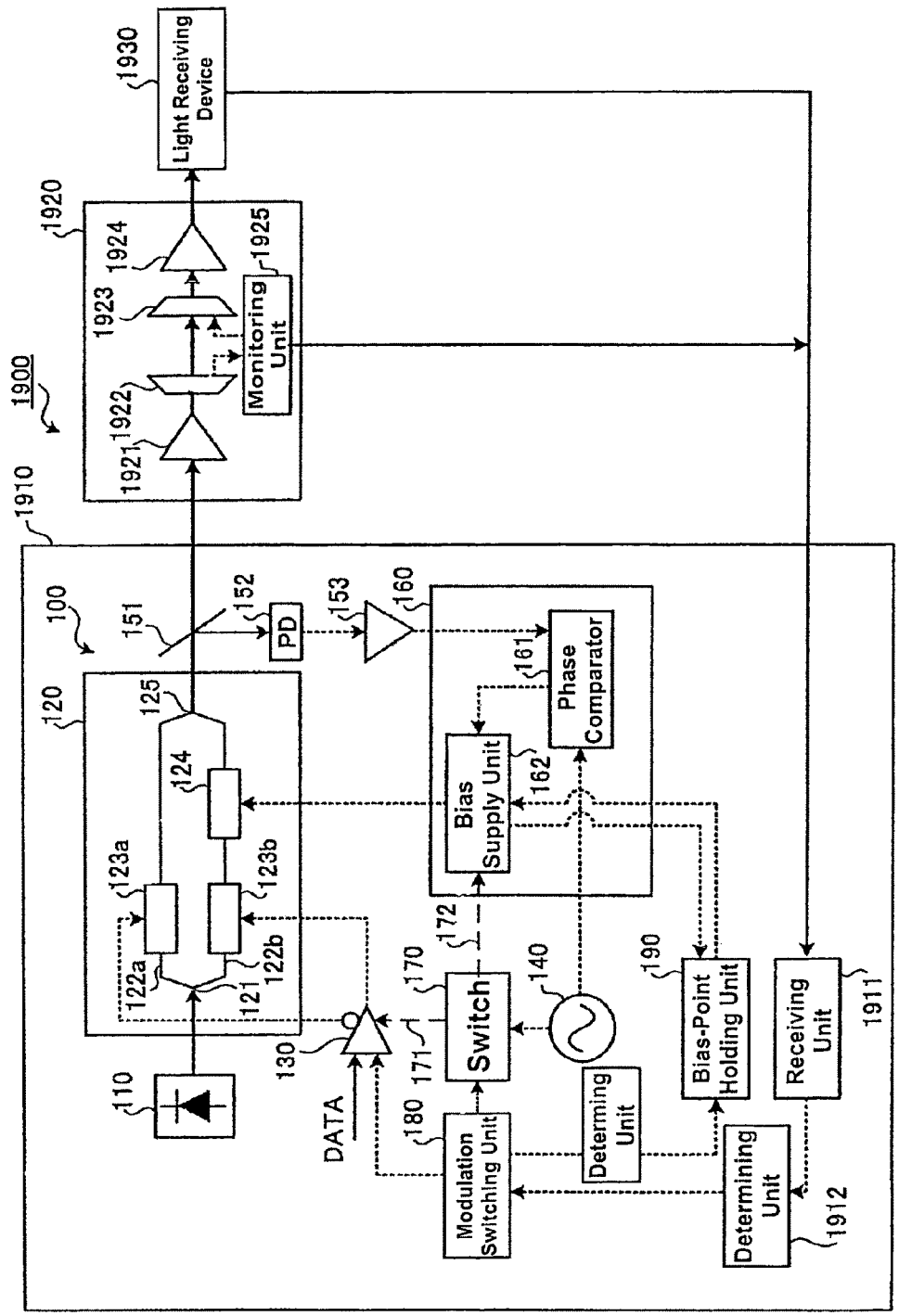
FIG. 19 is a block diagram showing the structure of an optical communication system according to the seventh embodiment.
Figure 20:
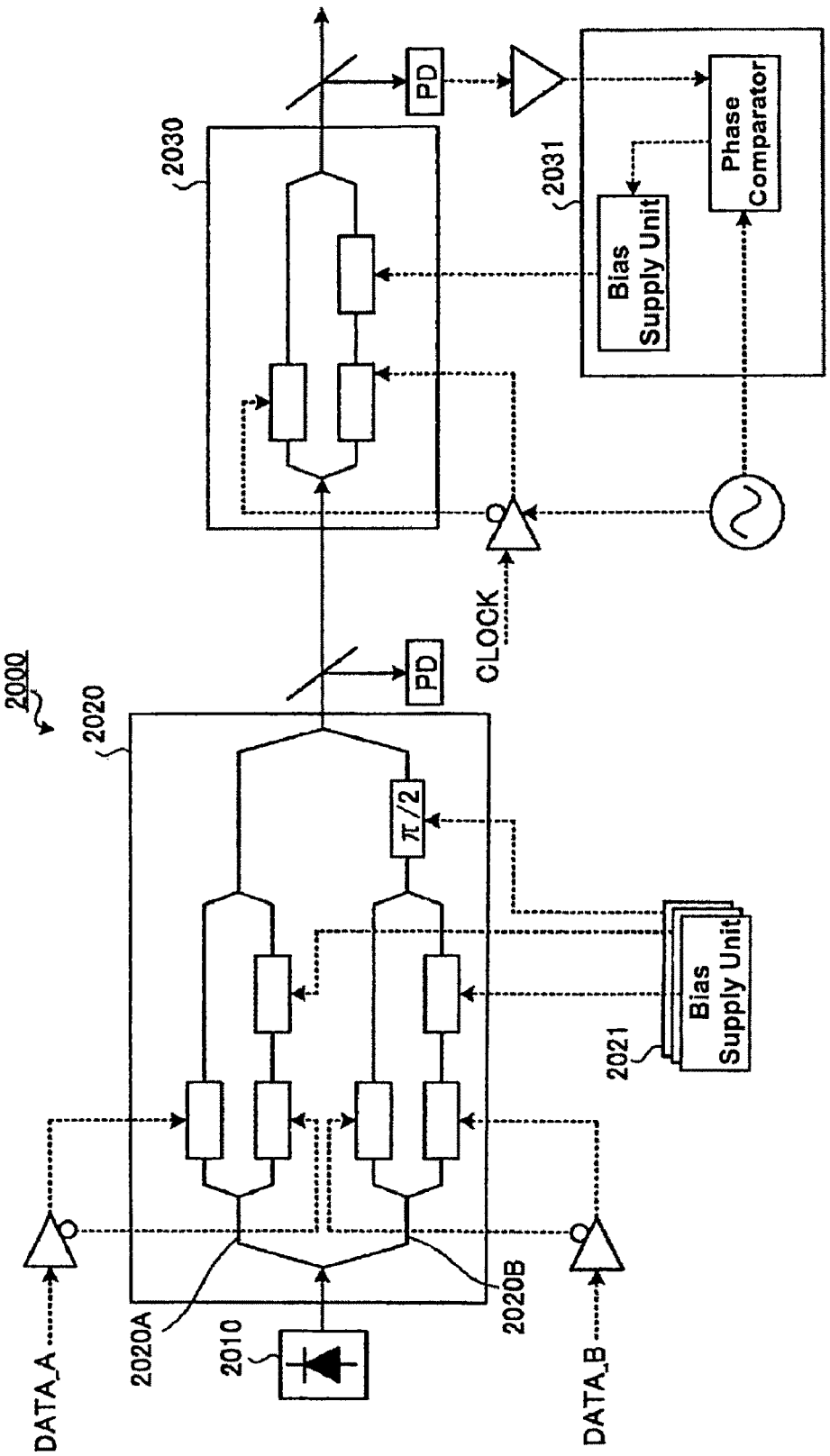
FIG. 20 is a block diagram showing the structure of a conventional optical modulator.

FIG. 19 is a block diagram showing the structure of an optical communication system according to the seventh embodiment. Referring to FIG. 19, the same components as those shown in FIG. 1 are designated by the same reference numerals, and a description thereof is omitted. As shown in FIG. 19, an optical communication system 1900 according to the seventh embodiment comprises: a light transmitting device 1910; a light repeater 1920; and a light receiving device 1930.

The light transmitting device 1910 comprises: the optical modulation device 100 according to the first embodiment; a receiving unit 1911; and a determining unit 1912. The light transmitting device 1910 transmits, via the light repeater 1920, the signal light that is modulated by the optical modulation device 100 and is output from the branch unit 151 to the light receiving device 19.

The light repeater 1920 repeats the signal light transmitted from the light transmitting device 1910 to the light receiving device 1930. Specifically, the light repeater 1920 comprises: an amplifying unit 1921; a multiplexing and splitting unit 1922: a multiplexing unit 1923; an amplifying unit 1924; and a monitoring unit 1925. The amplifying unit 1921 amplifies the signal light transmitted from the light transmitting device 1910 and the amplified light to the multiplexing and splitting unit 1922.

The multiplexing and splitting unit 1922 multiplexes and splits the signal light output from the amplifying unit 1921. The multiplexing unit 1923 multiplexes the signal light transmitted from the light transmitting device 1910 to another signal light, and outputs the resultant light to the amplifying unit 1924. The amplifying unit 1924 transmits the signal light output from the multiplexing unit 1923 to the light receiving device 1930. The monitoring unit 1925 monitors the signal light output from the light transmitting device 1910, and transmits information on the result of monitoring the signal light to the light transmitting device 1910.

The light receiving device 1930 receives the signal light transmitted from the light repeater 1920. Further, the light receiving device 1930 monitors the received signal light and transmits information on the monitoring result to the light transmitting device 1910. Furthermore, the light receiving device 1930 may transmit a request for transmitting the signal light to the light transmitting device 1910.

The receiving unit 1911 in the light transmitting device 1910 receives the information transmitted from the light repeater 1920 or the light receiving device 1930, and outputs the received information to the determining unit 1912. The determining unit 1912 determines the modulation on the basis of the information output from the receiving unit 1911. For example, the determining unit 1912 determines the modulation by which the transmission characteristics are best on the basis of the information on the result of monitoring the signal light transmitted from the light repeater 1920 or the light receiving device 1930.

For example, the determining unit 1912 collects information on a transmission path including the transmission distance from the light transmitting device 1910 to the light receiving device 1930, the interval between wavelengths of WDM, the number of steps of the repeater, or a transmission band of an optical filter on the basis of the request for transmitting the signal light transmitted from the light receiving device 1930, and determines the modulation by which the transmission characteristics become the best ones on the basis of the collected information on the transmission path.

Further, the light repeater 1920 or the light receiving device 1930 may transmit the information on the transmission path, and the determining unit 1912 may determine the modulation having the best transmission characteristics on the basis of the information on the transmission path transmitted from the light repeater 1920 or the light receiving device 1930. The determining unit 1912 outputs the modulation switching information indicating the switching to the determined modulation to the modulation switching unit 180. The modulation switching unit 180 obtains the modulation switching information output from the determining unit 1912, and switches the modulation in accordance with the obtained modulation switching information.

Although the optical modulation device 100 according to the first embodiment is applied to the optical communication system 1900, the optical modulation device 100 according to the embodiments can be applied to the optical communication system 1900. Further, the optical communication system 1900 comprises the light repeater 1920 and the light receiving device 1930 as mentioned above. However, the optical communication system 1900 may comprise one of the light repeater 1920 and the light receiving device 1930.

The optical communication system 1900 according to the seventh embodiment has the advantages of the optical modulation device 100 according to the above embodiments. Further, the best modulation is automatically determined on the basis of the information sent from the light repeater 1920 or the light receiving device 1930, and the modulation can be switched to the determined modulation.

As mentioned above, with the optical modulator and the light-modulation switching method according to the present invention, the drive signal for the MZ modulator is switched, thereby switching the modulation. Therefore, even if changing the transmission condition of the optical communication system, the modulation can be switched to a modulation by which the transmission characteristics do not deteriorate against the changed transmission condition.

Further, with the optical modulator and the light-modulation switching method according to the present invention, one MZ modulator can switch the modulation. Therefore, a plurality of modulators corresponding to the modulations do not need to be provided so as to switch the modulations, the size of the apparatus is decreased, the apparatus is simplified, and costs are reduced.

Furthermore, with the optical modulator and the light-modulation switching method according to the present invention, the modulation is matched to that of the optical communication device as the communication destination. Therefore, the optical transmission is possible between the optical communication devices using different modulations. In addition, the modulation switching information is obtained, thereby automatically and immediately switching the modulation. Moreover, it is possible to flexibly cope with the optical communication system in which the transmission condition frequently changes.

In addition, with the optical modulator and the light-modulation switching method according to the present invention, the control information on the bias point corresponding to the modulation is held, thereby efficiently controlling the bias voltage upon switching the modulation. Therefore, it is possible to reduce the time from changing the modulation to stabilizing the transmission characteristics of the signal light.

INDUSTRIAL APPLICABILITY

As mentioned above, the optical modulator and the light-modulation switching method according to the present invention are advantageous for switching the modulation. In particular, the optical modulator and the light-modulation switching method according to the present invention are suitable to the case of switching the modulation in accordance with the transmission condition and the optical communication device as the communication destination.

ADVANTAGES

Advantageously, the modulation can be flexibly switched without arranging a plurality of modulators corresponding to the modulations according to the present invention.

What is claimed is:

1. A method for modulating an inputted light with a Mach-Zehnder modulator, the method comprising:
supplying a drive signal to the Mach-Zehnder modulator;
supplying a bias signal to the Mach-Zehnder modulator;
modulating the inputted light with the Mach-Zehnder modulator based on the drive signal and the bias signal;
receiving information of a selected modulation format that is designated by an external input and that is selected from a plurality of modulation formats; and
controlling the drive signal and to which of the drive signal or the bias signal a predetermined frequency signal is superimposed so as to provide a bias voltage to the Mach-Zehnder modulator in accordance with a frequency component of the predetermined frequency signal in a modulated signal light from the Mach-Zehnder modulator, in accordance with the selected modulation format.

2. The method of the claim 1, wherein:
in the controlling, a voltage of the drive signal is controlled so that the voltage approaches $2V\pi$ when the selected modulation format is DPSK.

3. The method of the claim 1, wherein:
in the controlling, a voltage of the drive signal is controlled so that the voltage approaches $V\pi$ when the selected modulation format is NRZ.

4. The method of the claim 1, wherein:
in the controlling, a voltage of the drive signal is controlled so that the voltage approaches $V\pi$ when the selected modulation format is RZ.

5. The method of the claim 1, wherein:
in the controlling, a voltage of the drive signal is controlled in an off state when the selected modulation format is non modulation.

6. The method of the claim 1, wherein:
in the controlling, a voltage of the drive signal is controlled so that the voltage approaches $2V\pi$ when the selected modulation format is CSRZ.

7. The method of the claim 1, further comprising:
converting a frequency of the driving signal based on the selected modulation format.

8. A method for modulating an inputted light with a Mach-Zehnder modulator, the method comprising:
supplying a drive signal to the Mach-Zehnder modulator;
supplying a bias signal to the Mach-Zehnder modulator;
modulating the inputted light with the Mach-Zehnder modulator based on the drive signal and the bias signal;
receiving information of a selected modulation format that is designated by an external input and that is selected from a plurality of modulation formats; and
controlling the bias signal and to which of the drive signal or the bias signal a predetermined frequency signal is superimposed so as to provide a bias voltage to the Mach-Zehnder modulator in accordance with a frequency component of the predetermined frequency signal in a modulated signal light from the Mach-Zehnder modulator, in accordance with the selected modulation format.

* * * * *